(12) United States Patent
Sekertzis et al.

(10) Patent No.: US 9,184,643 B2
(45) Date of Patent: Nov. 10, 2015

(54) ELECTRIC MACHINE

(75) Inventors: Vassilios Sekertzis, Stuttgart (DE);
Gianna Nario-Rivera, Dortmund (DE)

(73) Assignee: Robert Bosch GmbH, Stuttgart (DE)

( * ) Notice: Subject to any disclaimer, the term of this patent is extended or adjusted under 35 U.S.C. 154(b) by 906 days.

(21) Appl. No.: 13/496,243

(22) PCT Filed: Sep. 17, 2010

(86) PCT No.: PCT/EP2010/063715
§ 371 (c)(1),
(2), (4) Date: May 9, 2012

(87) PCT Pub. No.: WO2011/033073
PCT Pub. Date: Mar. 24, 2011

(65) Prior Publication Data
US 2012/0217829 A1 Aug. 30, 2012

(30) Foreign Application Priority Data
Sep. 17, 2009 (DE) .......................... 10 2009 042 563

(51) Int. Cl.
*H02K 11/04* (2006.01)
*H02K 19/36* (2006.01)

(52) U.S. Cl.
CPC ............ *H02K 11/046* (2013.01); *H02K 19/365* (2013.01)

(58) Field of Classification Search
CPC ........... H02K 5/225; H02K 5/22; H02K 9/22; H02K 3/26; H02K 11/046; H02K 19/365
USPC ........................................ 310/71, 68 D, 68 R
See application file for complete search history.

(56) References Cited

U.S. PATENT DOCUMENTS 5,682,070 A * 10/1997 Adachi et al. .................... 310/71
5,798,586 A * 8/1998 Adachi ............................ 310/54

(Continued)

FOREIGN PATENT DOCUMENTS

DE 2643612 4/1977
DE 102007038526 2/2009

(Continued)

OTHER PUBLICATIONS

PCT/EP2010/063715 International Search Report dated Nov. 30, 2010 (Translation and Original, 5 pages).

*Primary Examiner* — Terrance Kenerly
(74) *Attorney, Agent, or Firm* — Michael Best & Friedrich LLP

(57) ABSTRACT

Electric machine (10), in particular an alternating current generator, comprising a rotor (20) having a rotational axis (26), a stator (16) made of a stator iron (17) and a stator winding (18) inserted therein, said winding having conductor ends (228), which are interconnected with a rectifier device (139), a controller (231) for controlling an excitation current, and a cooling device in the rectifier device (139), comprising a first cooling body (53), which has at least one receptacle (66) on which a current rectifier (147) is received, and a second cooling body (117), wherein the cooling body (117) has at least one receptacle (120) on which a current rectifier (150) is received, an interconnection unit (144), which interconnects the current rectifiers (147, 150) into a bridge circuit, wherein the interconnection unit (144) comprises a plurality of integral guide sockets (225) in which conductor ends (228) of the stator winding (18) are received, wherein a guide socket (225) is disposed between the end shield (13.2) and the controller (231) in the direction of the rotational axis (26).

11 Claims, 21 Drawing Sheets

(56) References Cited

U.S. PATENT DOCUMENTS

| | | | |
|---|---|---|---|
| 6,285,100 B1* | 9/2001 | Pflueger et al. | 310/68 D |
| 6,307,289 B1* | 10/2001 | Skala | 310/68 D |
| 6,617,723 B1* | 9/2003 | Shichijyo | 310/71 |
| 7,612,474 B2* | 11/2009 | DePetris et al. | 310/68 D |
| 7,720,516 B2* | 5/2010 | Chin et al. | 600/322 |
| 2002/0043881 A1* | 4/2002 | Asao et al. | 310/54 |
| 2004/0263007 A1* | 12/2004 | Malanga et al. | 310/52 |
| 2005/0001492 A1* | 1/2005 | Bradfield et al. | 310/68 D |
| 2005/0194850 A1* | 9/2005 | Bradfield et al. | 310/68 D |
| 2006/0156963 A1 | 7/2006 | Fischer | |
| 2007/0278872 A1 | 12/2007 | Elser et al. | |
| 2009/0033181 A1 | 2/2009 | Hamada | |
| 2011/0285230 A1* | 11/2011 | Sekertzis et al. | 310/89 |

FOREIGN PATENT DOCUMENTS

| | | |
|---|---|---|
| EP | 1551093 | 7/2005 |
| GB | 1600255 | 10/1981 |
| RU | 2061991 | 6/1996 |
| RU | 2244372 | 1/2005 |

* cited by examiner

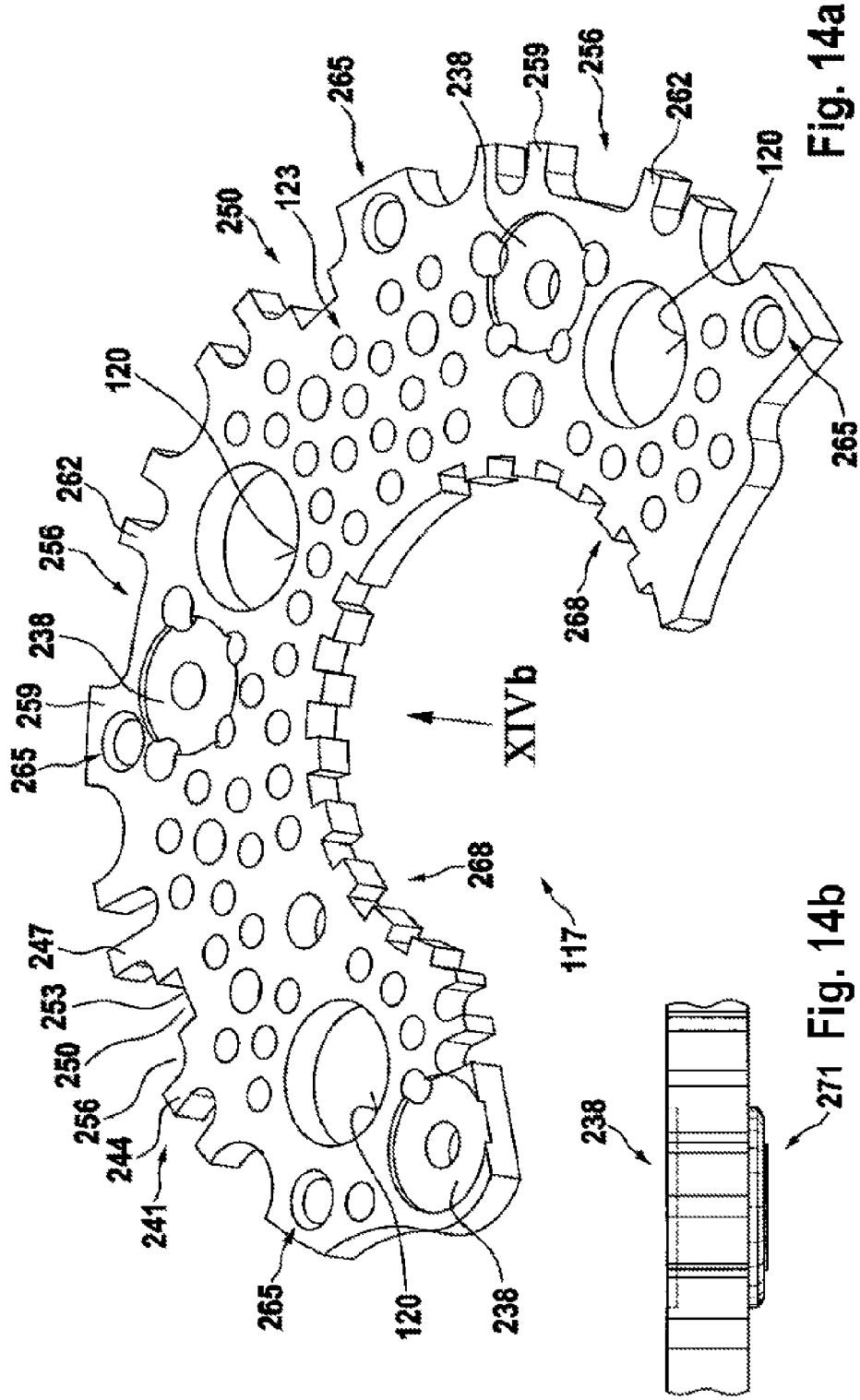
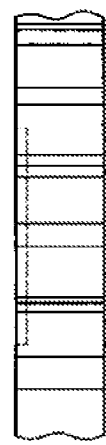
Fig. 14a
Fig. 14b

ELECTRIC MACHINE

BACKGROUND OF THE INVENTION

An electric machine designed as an alternating current generator is known from EP 960464 B1.

SUMMARY OF THE INVENTION

The aim of the proposed solution is to achieve an embodiment of the electric machine which is as compact as possible. This is possible, in particular, because the guide stub between the end shield and the regulator is shorter in the direction of the conductor ends disposed in the guide stub than other guide stubs. In order, on the one hand, to obtain good attachment of the regulator to the end shield and, on the other hand, to obtain the cited embodiment of maximum compactness, one arm, which connects the shorter guide stub integrally to the other guide stubs, reaches around a fixing stub, on which the regulator is fixed, radially from the inside. The arm thus extends in an arc around the fixing stub, on the radially inner side of the latter. In order, on the one hand, to obtain as compact a construction as possible and, on the other hand, to avoid hindering the flow which is important for cooling, a terminal contact directly associated with the short guide stub conductor in the form of a circumferential arc is disposed partially under an outer edge of at least one receptacle in the direction of the axis of rotation, and, for this purpose, is preferably disposed between the end shield and the heat sink. In order to obtain a spacing that provides sufficient electrical insulation between the diode head wires and the circumferential arc, the circumferential arc has a plurality of bending points, wherein some of these bending points are disposed at the same circumferential position as terminal contacts. To avoid having to dispose the circumferential arc under a regulator, thereby taking up more space and room than required, the circumferential arc is extended over an angle with respect to the axis of rotation which is greater than the total angle over which the current rectifiers extend in the heat sinks. The circumferential arc is provided with low vibration mounting and is therefore protected from vibration fractures since the circumferential arc is supported on the guide stubs by means of integrally formed lugs. In order once again to obtain space savings, the stator winding disposed in the stator or stator iron has conductor ends which are of different lengths and are preferably matched to the guide stubs of different sizes or lengths.

BRIEF DESCRIPTION OF THE DRAWINGS

In the drawing:

FIG. 14a and FIG. 14b show a three-dimensional view of another heat sink of the cooling device of a rectifier device in accordance with a second illustrative embodiment, and a scrap view from the side.

DETAILED DESCRIPTION

Figure 1:
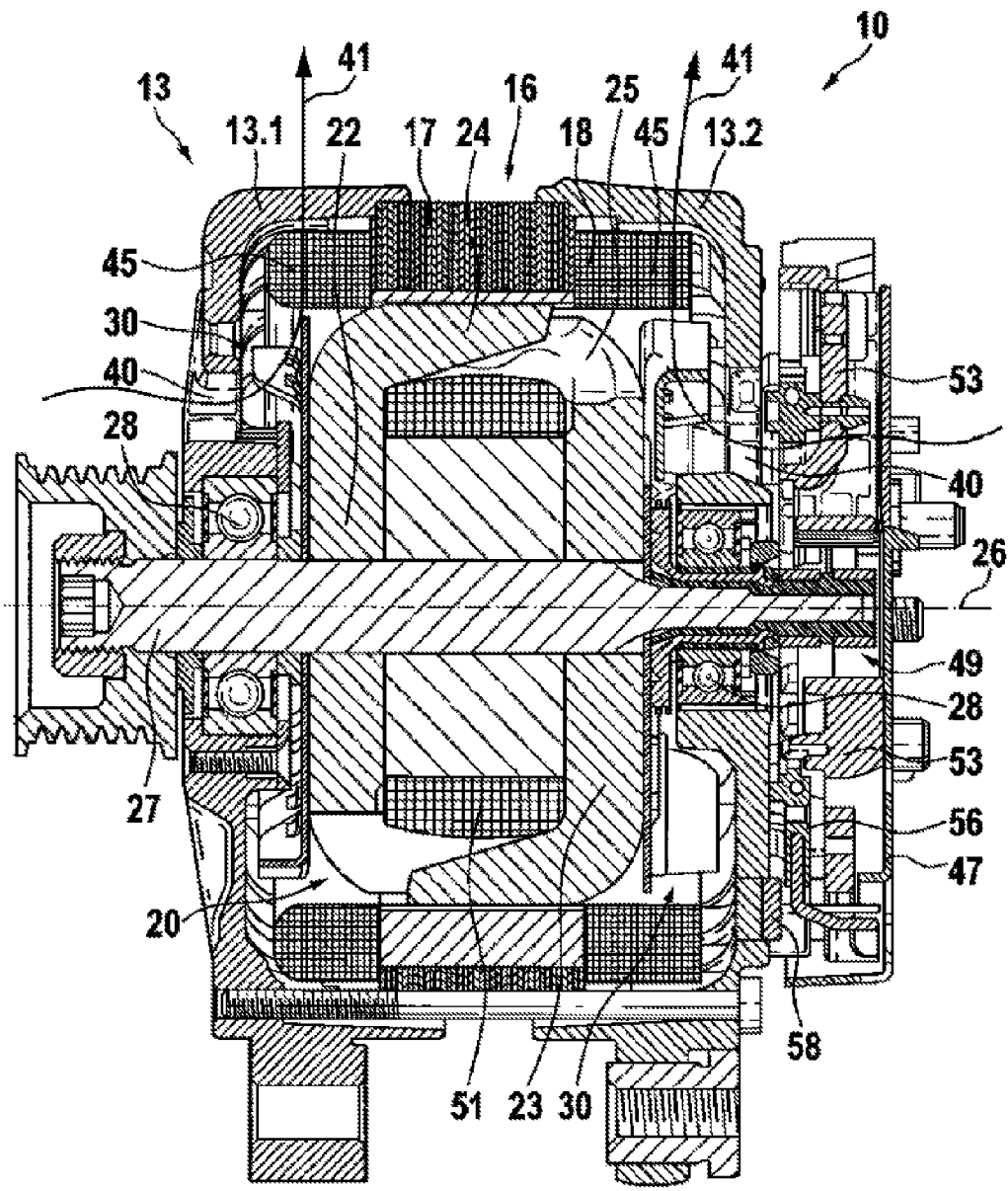
FIG. 1 shows a longitudinal section through an electric machine.

FIG. 1 shows a cross section through an electric machine 10, in this case embodied as a generator or alternating current, in particular three-phase, generator for motor vehicles. This electric machine 10 comprises, inter alia, a two-part housing 13, which consists of a first bearing shield 13.1 and a second bearing shield 13.2. Bearing shield 13.1 and bearing shield 13.2 accommodate between them what is referred to as a stator 16, which consists, on the one hand, of a stator iron 17 substantially in the form of a circular ring, and into the radially inward-oriented, axially extending grooves of which a stator winding 18 is inserted. The radially inward-oriented grooved surface of this ring-shaped stator 16 surrounds a rotor 20, which is designed as a claw pole rotor. The rotor 20 comprises, inter alia, two claw pole plates 22 and 23, on the outer circumference of which in each case axially extending claw pole fingers 24 and 25 are disposed. In this context, the axial direction is defined by an axis of rotation 26 of the rotor 20. Both claw pole plates 22 and 23 are disposed in such a way in the rotor 20 that the axially extending claw pole fingers 24 and 25 respectively thereof alternate on the circumference of the rotor 20. This results in magnetically required gaps between the oppositely magnetized claw pole fingers 24 and 25, which are referred to as claw pole gaps. The rotor 20 is rotatably mounted in the respective end shields 13.1 and 13.2 by means of a shaft 27 and respective rolling contact bearings 28 situated at each end of the rotor.

Overall, the rotor 20 has two axial end faces, on each of which a fan 30 is fixed. This fan 30 consists essentially of a plate-shaped or disk-shaped section, from which fan blades extend in a known fashion. These fans 30 serve to allow an exchange of air between the outside of the electric machine 10 and the inside of the electric machine 10 via openings 40 in the end shields 13.1 and 13.2. It is for this purpose that the openings 40 are provided substantially at the axial ends of the end shields 13.1 and 13.2, via which openings cooling air 41 is drawn into the inside of the electric machine 10 as a coolant by means of the fans 30. The rotation of the fans 30 accelerates this cooling air radially outward so that it can pass through the winding overhang 45, which allows the cooling air through. This effect cools the winding overhang 45. After passing through and circulating around the winding overhang 45, the cooling air follows a path radially outward through openings that are not shown here in this FIG. 1.

On the right-hand side of FIG. 1, there is a protective cap 47, which protects various components from outside influences. For example, this protective cap 47 covers a "slip ring" assembly 49, which serves to supply excitation current to an excitation winding 51. This slip ring assembly 49 is surrounded by a first heat sink 53, which in this case acts as a positive heat sink. Another heat sink, which is not visible in this figure, which is schematic to varying degrees, acts as a "negative heat sink". Disposed between the end shield 13.2 and the heat sink 53 is a terminal plate 56, which serves to connect the negative diodes 58 disposed in the negative heat sink and positive diodes, not shown here in this figure, in the heat sink 53 to one another, thus producing a bridge circuit known per se.

Figure 2:
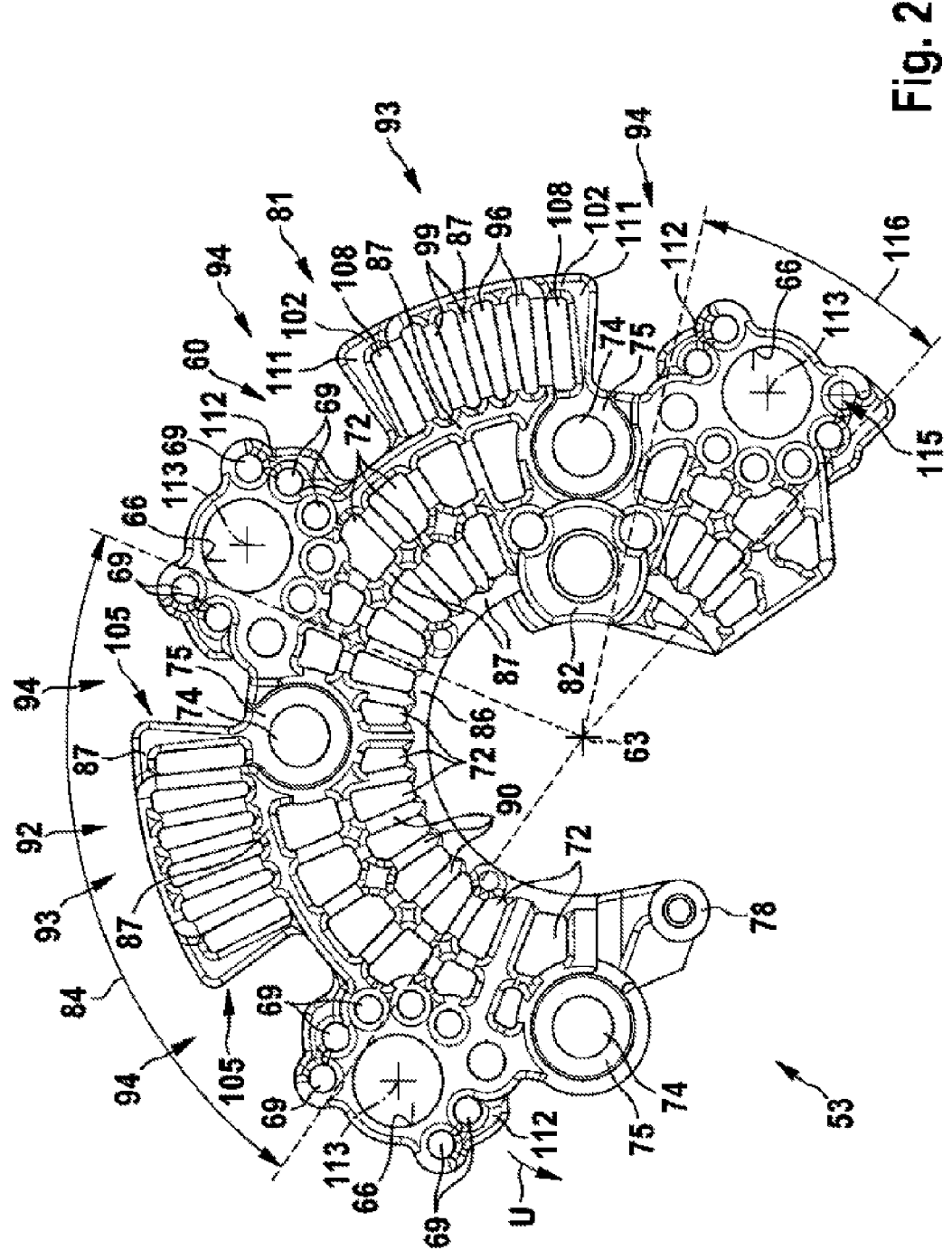
FIG. 2 shows a plan view of a heat sink of a cooling device of a rectifier device in accordance with a first illustrative embodiment.

FIG. 2 depicts a first heat sink 53. This heat sink 53 has an arcuate sink area 60. This arcuate sink area 60 has a central center point 63. When mounted on the housing 13.2, it coincides with the axis of rotation 26. The heat sink 53 has three receptacles 66, each of which serves to receive a current rectifier. In this case, the current rectifier is a positive diode, for example. In this case, the receptacles 66 are in the form of a hole, into which "press-fit" diodes (positive diodes) are subsequently pressed, for example. As an alternative, it is also possible, for example, for a depression to be provided in the surface of the first heat sink 53 to enable a diode to be fixed in the depression by soldering. Instead of being soldered in a depression, it is also possible for a diode to be soldered on at an envisaged location in the same plane. Moreover, the heat sink 53 has numerous openings to enable coolant to flow through the heat sink 53, which is hot during operation. First openings 69 are disposed one beside the other in an arc around a receptacle 66. These first openings 69 are disposed on both sides of a receptacle 66 in the circumferential direction U, i.e. to the right and left, for example, as seen from the center point 63. At least one elongate second opening 72 is disposed in the direction of the central center point 63, between the receptacles 66 and the central center point 63, wherein the elongate shape of the second opening 72 is aligned at least substantially with the central center point 63. As a further approximation, it can also be ascertained that a plurality of elongate second openings 72 is disposed between the receptacles 66 having the first openings 69 and the central center point 63 in a direction toward the central center point 63, wherein the elongate shape of the second openings 72 is at least substantially aligned with the central center point 63. "Elongate" means that the openings 72 extend further in the radial direction than in the circumferential direction.

Three cylindrical countersunk areas 75, each provided with a hole 74, are furthermore provided in sink area 60. Here, the thickness of the material of the heat sink 53 is reduced to about 40% of that provided at the receptacles 66. These countersunk areas are used during assembly to fix the rectifier device on the outer side of the end shield 13.2. A threaded sleeve 78 is used for fixing and contact-making with another component of the rectifier device. An insertion dome 82 is used for the subsequent reception and fixing of a "B+ pin" (B plus pin), to which a charging cable is fixed to enable electric current to be fed to a vehicle battery.

As already mentioned, there are preferably a plurality of receptacles 66 disposed spaced apart on the circumference 81, i.e. preferably at or in the region of the outer circumference, of the heat sink 53. "At the outer circumference" means primarily in the radially outer half.

From FIG. 2, it can be seen that a preferably integrally formed overhang 92 of the heat sink 53 is disposed in a segment 84 between two receptacles 66, said overhang being embodied here in this example with a plurality of elongate second openings 72, which extend between two spars 87 extending in an arc. The overhang 92 is separated or spaced apart on both sides in the circumferential direction U from the receptacles 66 and the first openings 69 thereof by large trough-shaped recesses 94. A radially inner end of the trough-shaped recesses 94 is situated at a shorter distance from the central center point 63 than a central point 113 of a receptacle 66. The second openings 72 between two arcuate spars 87 are separated by webs 90. The webs 90 preferably extend radially. The two spars 87 extend at least approximately in a circular arc.

A ladder-like cooling segment 93 as an illustrative embodiment of an overhang 92 extends radially outward from the outer of the two spars 87 just mentioned in the segment 84 between two receptacles 66, said cooling segment being connected integrally to one spar 87. This ladder-like cooling segment 93 likewise has elongate cooling air openings 96, which are separated from one another by webs 99. In a radially outward direction, these cooling air openings 96 are bounded by a spar 102. In the circumferential direction U, toward its lateral edge 105, the cooling segment 93 has at least one opening 108, the thickness of the material of the border 111 of which is in part less than that of other openings 96 of the ladder-like cooling segment 93. In particular, provision is made for the lateral part of the border 111 which bounds a recess 94 and, if required, the radially outer one of the lateral openings 108 to have a reduced thickness of material.

Between the receptacles 66, at approximately the "1 o'clock" and "4 o'clock" positions (FIG. 2), there is likewise a cooling segment 93, the configuration of which is similar to that of the cooling segment 93 just described.

The openings 69 are disposed around the receptacles 66. To improve access to terminal contacts shown below, which are positioned next to the openings 69 in the rectifier device, provision is made to reduce the thickness of the material of borders 112 of the openings 69 on the side of the openings 69 remote from the central point 113 of a receptacle 66 in the axial direction (axis of rotation 26) or in the direction of a profile axis 115, as compared with that between the receptacles 66 and the openings 69. For the same reason, the thickness of the material of the lateral openings 108 is less. The profile axis 115 extends along the profile or passage profile of an opening 69.

Additional elongate openings 72 adjoin the two outer spars 87 radially toward the inside in another row and radially inward with a radially inner boundary provided by another spar 86.

The receptacle 66, the first openings 69 and the at least one elongate second opening 72 are situated in a sector 116 starting from the central center point (63), wherein the sector 116 has an angular range of between 25° and 40° (all illustrative embodiments).

Figure 3:
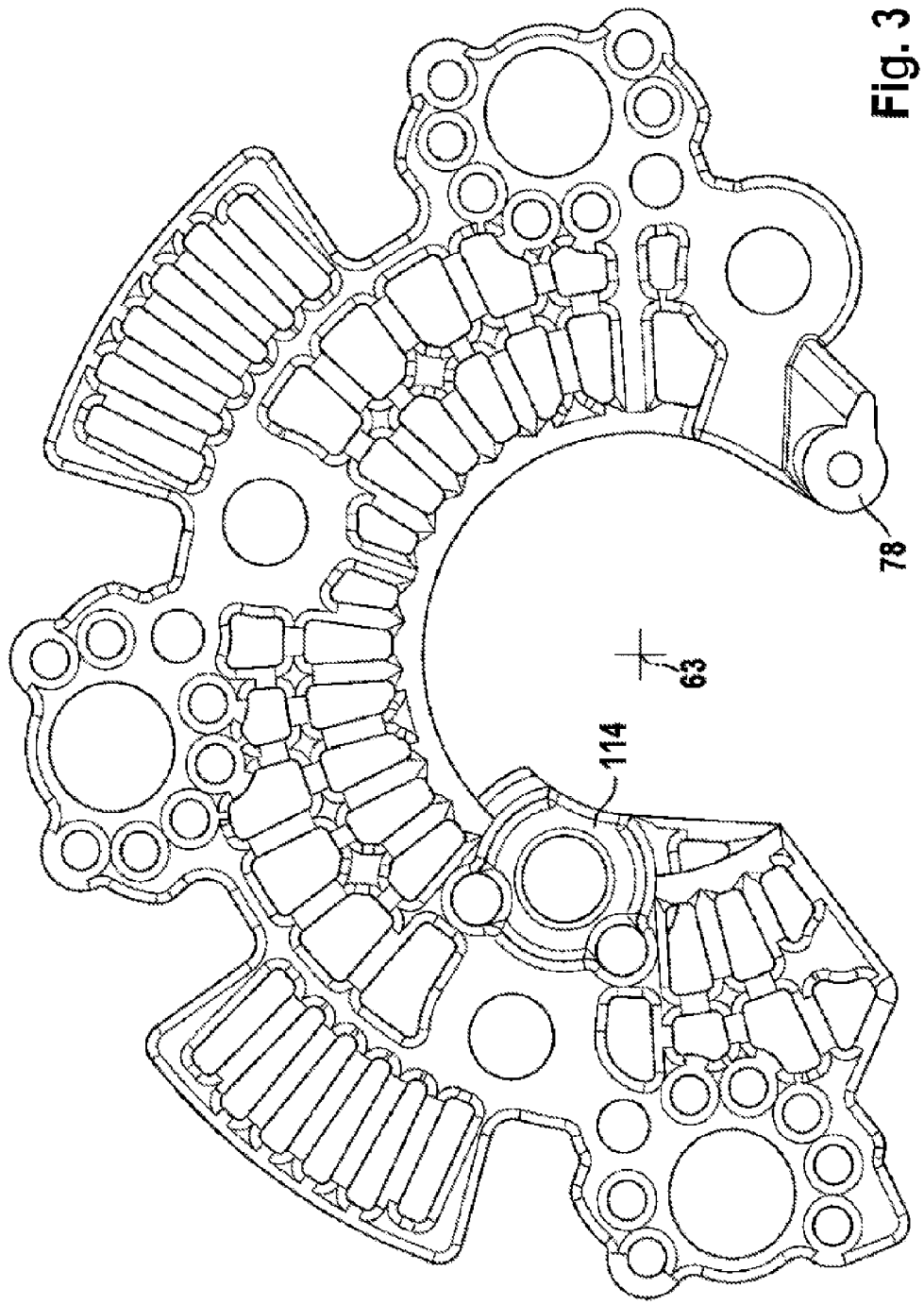
FIG. 3 shows a bottom view of the heat sink shown in FIG. 2.

FIG. 3 shows the rear side of the heat sink 53, which is not visible in FIG. 2. Both sides are substantially parallel to one another in some areas. The round head of a B+ pin is subsequently pushed into a depression 114 in such a way that the round head is accommodated in the depression 114 and a screw thread is visible from the side that can be seen in FIG. 2.

Figure 4:
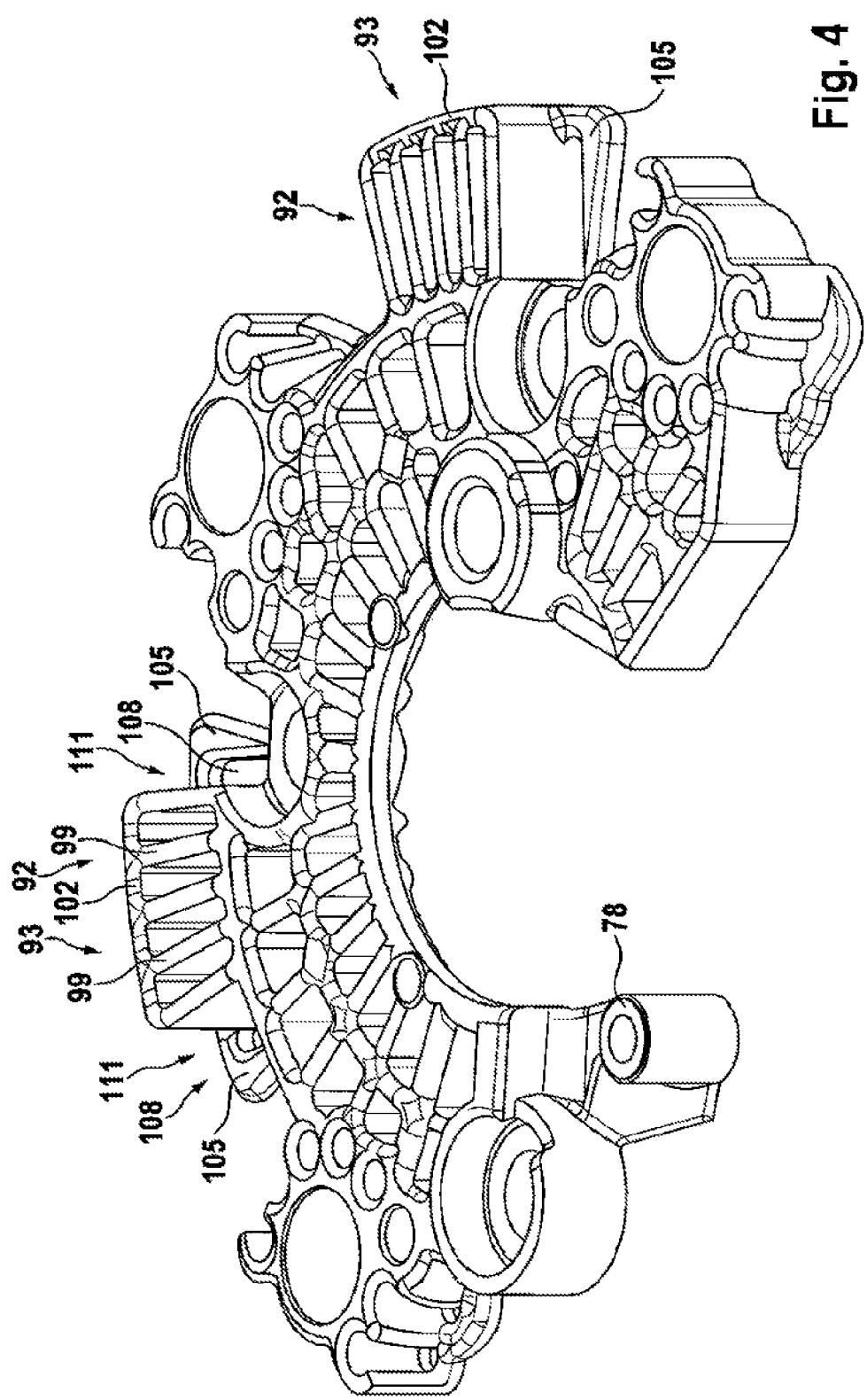
FIG. 4 shows a three-dimensional view of the heat sink shown in FIG. 2, FIG. 5a and FIG. 5b each show a detail view of a variant of the heat sink shown in FIG. 2.

FIG. 4 shows the heat sink 53 in a three-dimensional view from the side illustrated in FIG. 2. Here, the overhangs 92 or ladder-like cooling segments 93 are clearly visible. This applies especially to the openings 108 and the lateral edge 105 thereof, the thickness of the material of part of the border 111 of which is less than that of other openings 96 in the overhang 92 or ladder-like cooling segment 93.

Figure 5A:
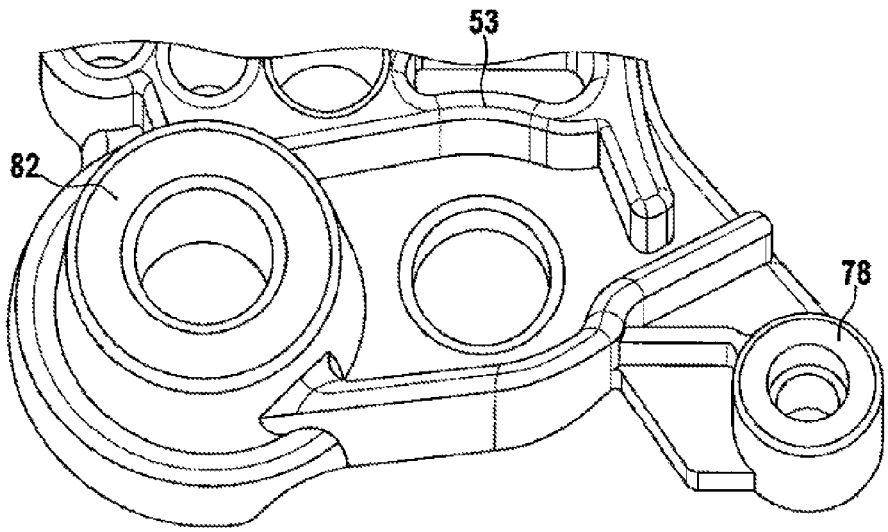
Figure 5B:
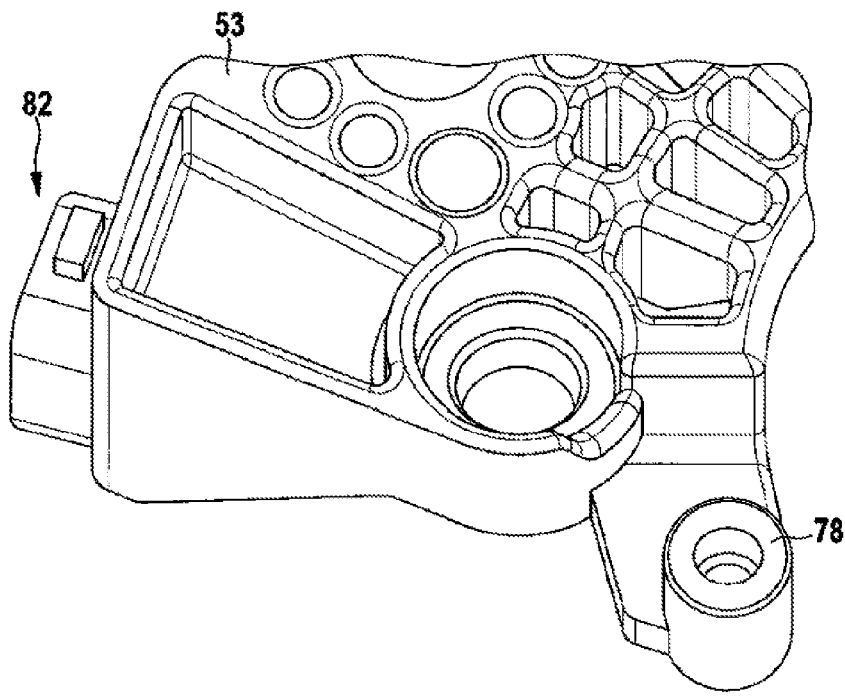

FIGS. 5a and 5b show various details and hence also alternatives for the fixing of a B+ pin. In FIG. 5a, an alternative or additional insertion dome 82 to that illustrated in FIG. 2, into which an additional or alternative B+ pin can be inserted, is provided adjacent to the countersunk area 75 situated at the "9 o'clock" position. In FIG. 5b, an insertion dome 82 is provided in an angled position. A B+ pin can be inserted into the insertion dome 82 from the right, on the underside of the heat sink 53.

Figure 6:
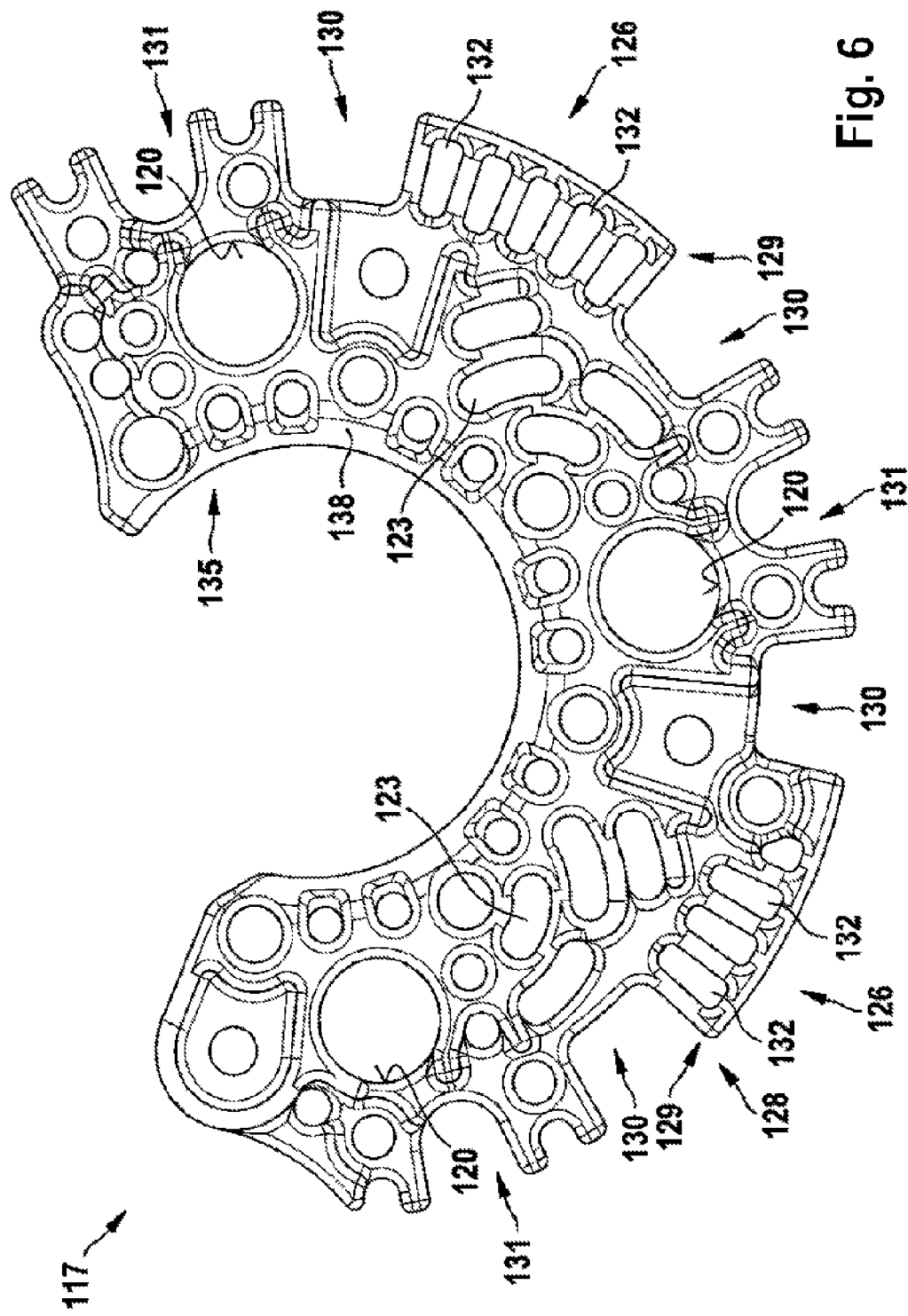
FIG. 6 shows a view of another heat sink of the cooling device of the rectifier device.

FIG. 6 depicts a further heat sink 117. Heat sink 117 has three receptacles 120, each of which serves to receive a current rectifier. Here, the current rectifier is a negative diode, for example. Here, the receptacles 120 take the form of a hole, into which "press-fit" diodes (negative diodes), for example, are subsequently pressed. As an alternative, for example, it is also possible for a depression to be provided in the surface of the further heat sink 117. Moreover, heat sink 120 has numerous openings 123, which allow coolant to flow through heat sink 120, which is hot during operation.

Figure 7:
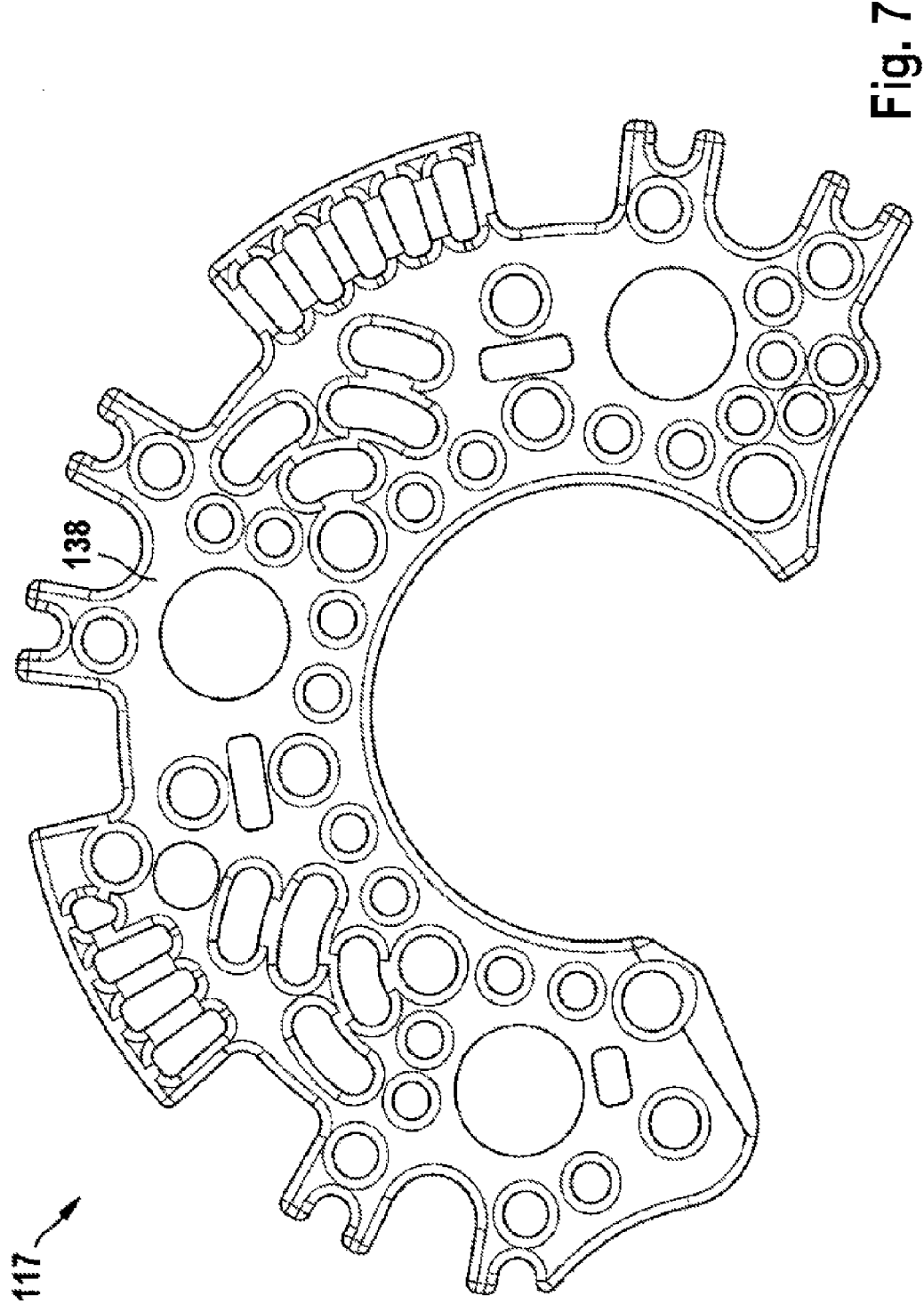
FIG. 7 shows another view of the heat sink shown in FIG. 6.

Here too, there is a preferably integrally formed overhang 127 in the form of a ladder-like cooling segment 129 at at least one point 126 on the circumference. This ladder-like cooling segment 129 has openings 132 which extend radially outward in elongate form. The cooling segment 129 extends over a defined sector of the circumference between two receptacles 120 in each case. At the inner circumference 135, the heat sink 117 is chamfered, chamfer 138. As can be seen in FIG. 7, the surface 138 which subsequently faces the first heat sink 53 is substantially flat. An outer contour 128 of the further heat sink 117 has a trough-shaped recess 130 on each side of the overhang 127, or directly adjacent thereto. These trough-shaped recesses 130 are in turn each situated between the overhang 127 and a respective further recess 131, when viewed in the circumferential direction. In the direction of the axis of rotation 26 envisaged, it can furthermore be ascertained that the overhang 127, recess 130 and recess 131 are each on an identical radius with respect to the axis of rotation 26.

When the cooling device is assembled, it is envisaged that the two heat sinks 53 and 117 will be layered one above the other, with a spacing, in a manner which allows flow through and between them, and the ladder-like cooling segment 129 of the further heat sink 117 will be disposed above the ladder-like cooling segment 93 of the first heat sink 53. Accordingly, the disclosure is of a cooling device 141, wherein said cooling device has a heat sink 117 which has further holes 123 and is substantially in the form of an annular segment, wherein a ladder-like cooling segment 129 is situated at at least one point 126 on the circumference, wherein the two heat sinks 53, 117 are layered one above the other, with a spacing, in a manner which allows flow through and between them, and the ladder-like cooling segment 129 of the further heat sink 117 is disposed above the ladder-like cooling segment 93 of the first heat sink 53.

Figure 8:
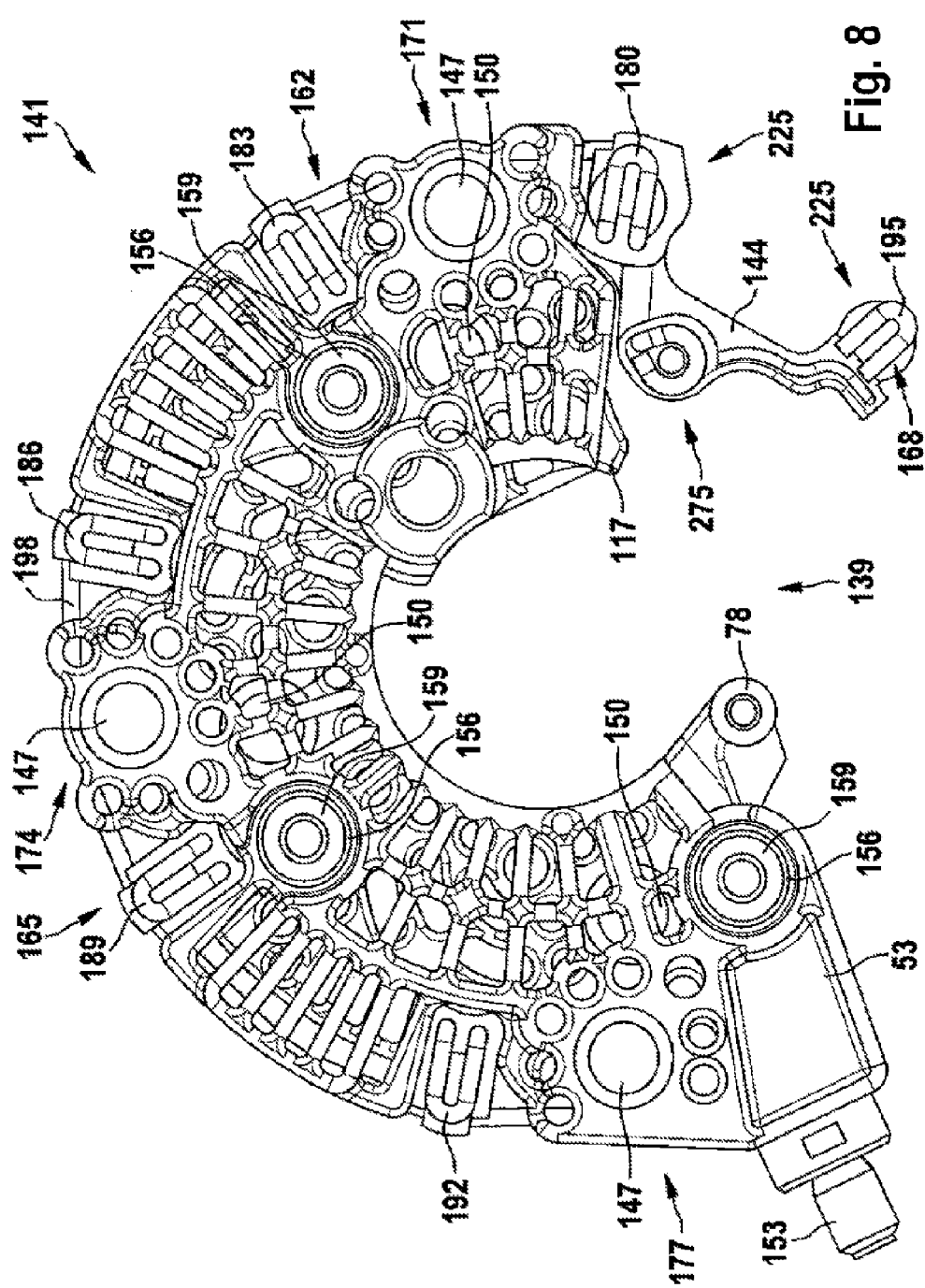
FIG. 8 shows a plan view of the cooling device and the rectifier device.

FIG. 8 shows the cooling device 141 assembled to form the rectifier device 139, comprising the first heat sink 53 (positive heat sink), the second heat sink 117 (negative heat sink), the interconnection unit 144, the positive current rectifiers 147 (positive diodes), the negative current rectifiers 150 (negative diodes), the B+ pin 153, the insulating sleeves 156 and the rivets 159 (tubular rivets). Spacers, which are not shown here, are furthermore used. In relation to FIG. 1, the view of the cooling device 141 corresponds to the view from the right in the direction of the axis of rotation 26, with the protective cap 47 removed.

In a known manner, the interconnection unit 144 has a plurality of conductor sections 162, 165 and 168, which serve to interconnect respective pairs 171, 174 and 177, each comprising a positive current rectifier 147 (positive diode) and a negative current rectifier 150, in such a way that the stator windings connected at the terminal contacts 180, 183, 186, 189, 192 and 195 (by way of the circumferential arc 198) and the alternating voltage supplied thereby are rectified. Terminal contacts 180 and 183 are connected to pair 171, terminal contacts 186 and 189 are connected to pair 174, and terminal contacts 192 and 195 are connected (by way of the circumferential arc 198) to pair 177.

Figure 9:
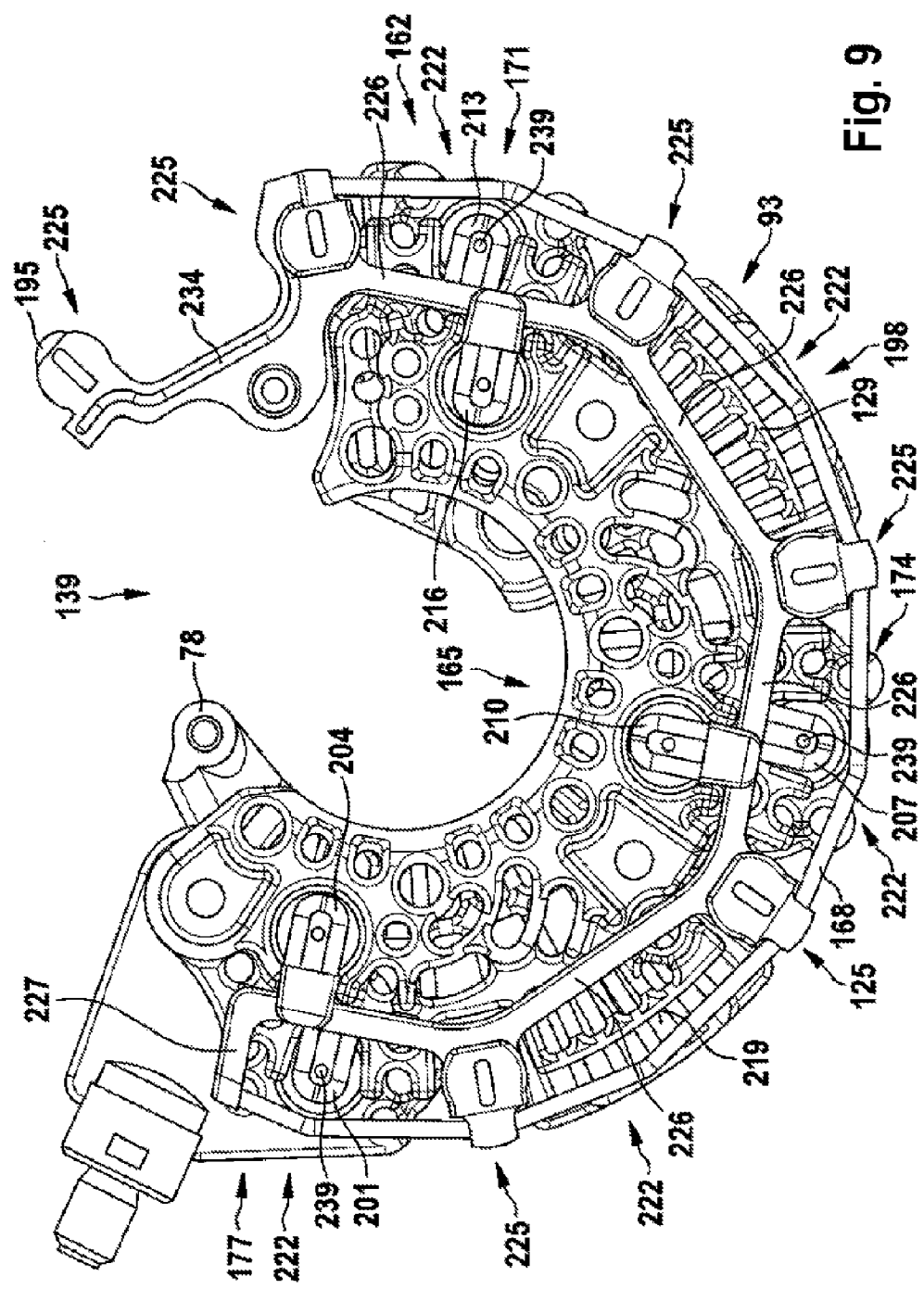
FIG. 9 shows a bottom view of the cooling device and of the rectifier device shown in FIG. 8.

FIG. 9 shows the assembled cooling device 141 from the other side, that not shown in FIG. 8. From this side, it is possible to see terminal contacts 201 and 204, terminal contacts 207 and 210 and terminal contacts 213 and 216, each interconnecting one pair 171, 174 and 177, each comprising a positive current rectifier 147 (positive diode) and a negative current rectifier 150. This interconnection corresponds to a conventional bridge rectifier circuit. The positive current rectifiers 147 (positive diodes), press-fit diodes and the negative current rectifiers 150 (negative diodes) are connected in an electrically conductive manner to the first heat sink 53, and therefore there is a positive voltage applied to the B+ pin 153 via the current rectifiers 150 during operation (ON condition, excitation current, rotating rotor 20).

The heat sink 117, which has holes 123, is substantially in the form of an annular segment, and there is an overhang 127 or ladder-like cooling segment 129 at at least one point 126 on the circumference, wherein the two heat sinks 53 and 117 are layered one above the other, with a spacing, in a manner which allows flow through and between them, and the ladder-like cooling segment 129 of the further heat sink 117 is disposed above the ladder-like cooling segment 93 of the first heat sink 53. A maximum outside diameter of the overhang 127 or cooling segment 129 is less than an outside diameter of the overhang 92 of cooling segment 93. In relation to the axis of rotation 26, the circumferential arc 198 is at the same axial position as an outer edge 219 and, in relation to FIG. 9, is above the overhang 92. As can be seen from FIG. 9, the circumferential arc 198 of the conductor section 168 has a plurality of bending points 222. Some of these bending points 222 are at the same position on the circumference as terminal contacts 201, 207 and 213. The effect of the bending points 222 is that a spacing (not designated specifically here) between a bending point 222 and a terminal contact 201, 207 and 213 is greater than if a simple circular arc were provided at the position of the bending point 222. A bending angle defined at the bending point 222 is disposed in such a way that the bending angle is on the radially inner side of the circumferential arc. The external angle complementary to the bending angle is larger than the bending angle. The circumferential arc 198 extends over an angle with respect to the central point (axis of rotation 26) which is greater than the total angle over which the current rectifiers 147 and 150 extend in the heat sink 53 and 117. In other words, the circumferential arc 198 extends over about 225° of the circumference in relation to the central point (axis of rotation 26). The circumferential arc 198 is supported on the guide stubs 225 by means of integrally formed lugs 223. In a side view, the rectifier device 139 can be described as follows: on the right and the left in the circumferential direction U, an overhang 92 initially has a recess 94, in which a guide stub 225 is seated. Adjacent to an overhang 127, on the right and the left in the circumferential direction U, there is initially a recess 130, in which a guide stub 225 is seated. Starting from the overhang 127, there is on the other side of the recess 130 a further recess 131, into which terminal contacts 239 (diode head wires) project.

The interconnection unit 144 has guide stubs 225 at a total of six positions in the example shown in FIGS. 8 and 9. These guide stubs 225 are intended to receive a number of conductor ends of the stator winding 18 by means of their funnel-shaped ends, which face the viewer in FIG. 9, and to guide them specifically to the (U- or loop-shaped) terminal contacts 180, 183, 186, 189, 192 and 195 protruding from the guide stubs and extending at an angle above the latter to enable contact to be made easily between the conductor ends and the terminal contacts 180, 183, 186, 189, 192 and 195, preferably by machine. Four of the tubular guide stubs 225 and respective terminal contacts 183, 186, 189 and 192 of the interconnection unit 144 are situated between a ladder-like cooling segment 93 and a receptacle 66. The two other guide stubs 225, at the "4 o'clock" and approximately the "5 o'clock" positions in FIG. 8, are outside the outer contour of the first heat sink 53. The guide stub 225 situated between the end shield 13.2 and the regulator 231 in the direction of the axis of rotation 26 is disposed outside the outer contour of the first heat sink 53, when viewed in the direction of the axis of rotation 26.

Figure 10:
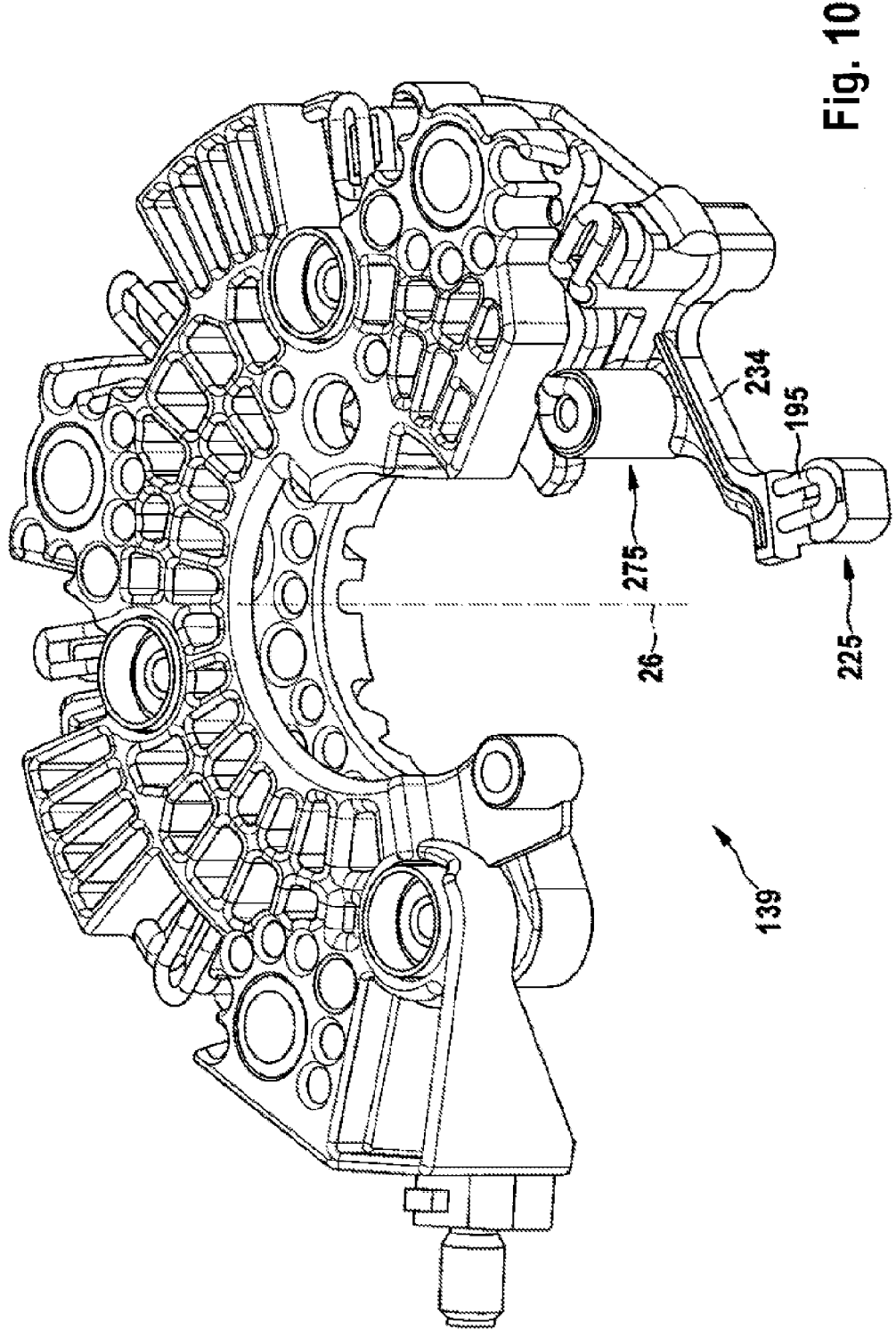
FIG. 10 shows a three-dimensional view of the subject matter of FIG. 8.

While the guide stub 225 at the "4 o'clock" position is substantially the same in terms of size and configuration to the other four guide stubs 225, the guide stub 225 at the "5 o'clock" position has a special feature. Thus, this guide stub 225, which is referred to below as the "small" guide stub 225, does have a terminal contact 195 as well. However, the guide stub 225 itself is a small guide stub 225 and is thus shorter in relation to the axis of rotation 26 than the other guide stubs 225 (see also FIG. 10). The guide stubs 225 are connected integrally to one another by webs 226. Conductor section 162 is situated in the web 226 between the guide stub 225 at the "2 o'clock" position (FIG. 9) and the guide stub 225 at the "4 o'clock" position. No conductor section is embedded in the web 226 between the "4 o'clock" position and the "6 o'clock" position but there is a conductor section embedded in the web 226 between the "6 o'clock" and the "7 o'clock" position. A further conductor section 162 is embedded between the guide stub 225 at the "9 o'clock" position and the end 227 of the interconnection unit 144, said end then merging into the circumferential arc 198 of conductor section 168 and leading to the small guide stub 225. With the exception of the circumferential arc 198, the conductor sections are each embedded in plastic material of the interconnection unit 144.

The majority of the interconnection unit 144 is situated in a region in which there is little or no flow of cooling air around it (dead zone of flow). This region is in the radially outer region (axis of rotation 26) underneath the first heat sink 53 (positive heat sink). At any rate, this holds for the webs 226 and the circumferential arc 198, which, in relation to the radial extent of the first heat sink 53 (positive heat sink), are both disposed under an outer half of the radial extent thereof. "Under" an outer half means that the webs 226 and the circumferential arc 198 are situated between the end shield and the heat sink 53 (positive heat sink). Moreover, the circumferential arc 198 and a radially outer edge of the receptacle 66 preferably coincide (see also FIG. 9).

Figure 11:
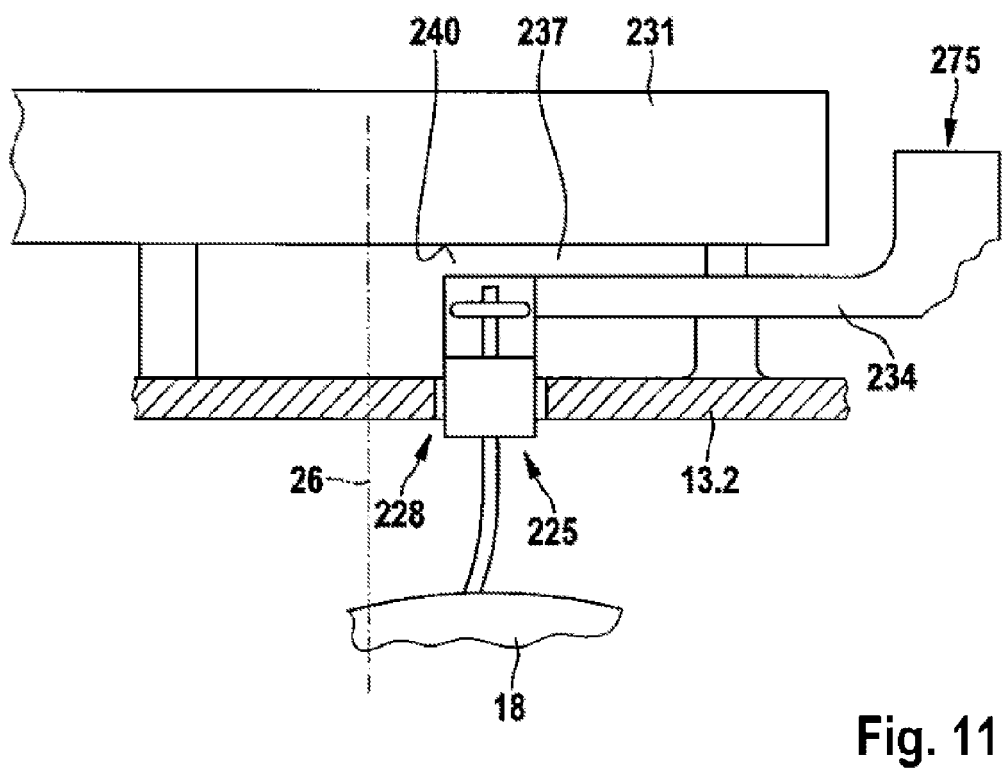
FIG. 11 shows a partial view from the side of the mounted rectifier device.
Figure 20:
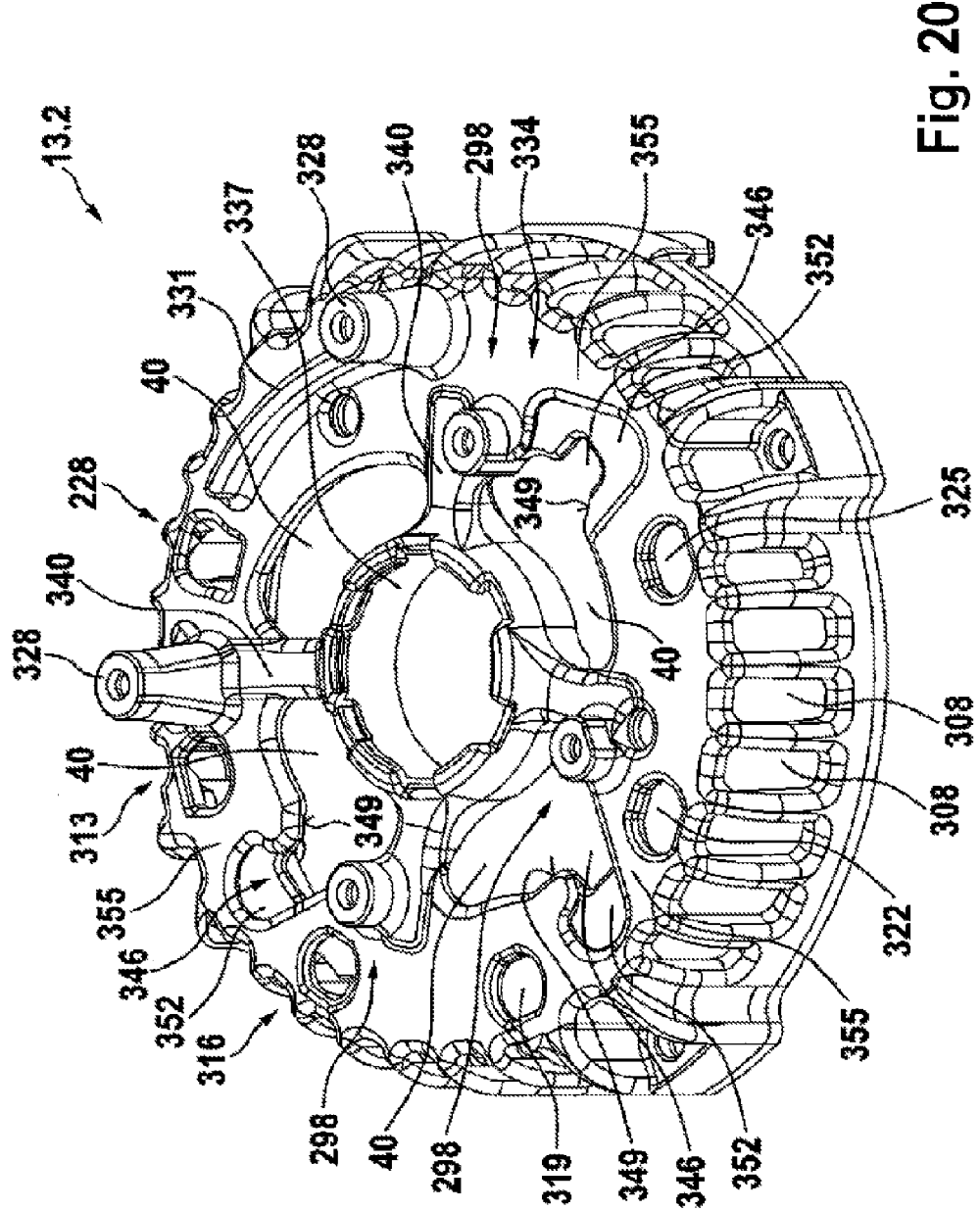
FIG. 20 shows a three-dimensional view of an end shield.
Figure 21:
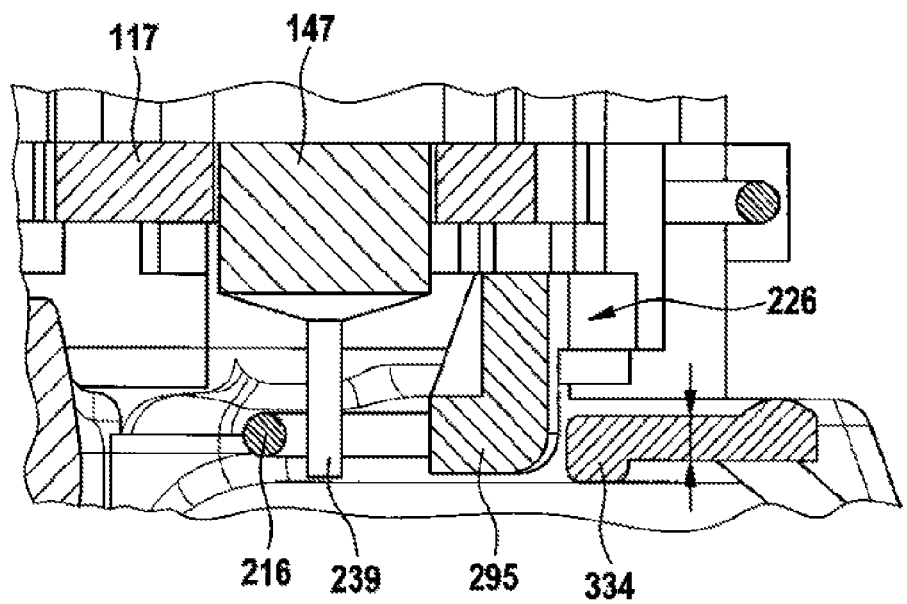
FIG. 21 shows a section through a pedestal in accordance with both illustrative embodiments.

In FIG. 11, it is possible to discern the purpose of this: like all the other guide stubs 225, the small guide stub 225 is disposed in or inserted into an opening 228 in the end shield 13.2. Conductor ends 228 of the stator winding 18 are inserted through the small guide stub 225, being connected in an electrically conductive manner to the terminal contact 195 at their upper end. At this point, there is preferably a welded joint or, alternatively, a soldered joint. It is likewise also possible, in an alternative embodiment, to provide a screwed joint here. Since this small guide stub 225 is made so short, it is possible to dispose it in a space-saving manner in the axial direction (axis of rotation 26) between the stator winding 18 and a regulator 231. The regulator 231 is used to produce an excitation current and to supply the excitation winding 51 with excitation current by means of brushes (not shown here) via the abovementioned slip ring assembly 49, and thereby to excite the rotor 20 electromagnetically. An arm 234, in which the conductor section 168 is embedded and which physically connects the two guide stubs 225, which are situated outside the outer contour of the first heat sink 53, likewise extends under the regulator 231 and hence into a gap 237 situated between an underside 240 of the regulator 231, said underside facing the end shield 13.2 in the axial direction (axis of rotation 26), and the end shield 13.2 itself. The arm 234, which connects the short guide stub 225 integrally to the other guide stubs 225, reaches around a fixing stub 328 radially from the inside (FIG. 20).

Thus what is disclosed is an electric machine 10, in particular an alternating current generator, having a rotor 20, which has an axis of rotation 26, having a stator 16 consisting of a stator iron 17 and a stator winding 18 inserted therein, which winding has conductor ends 228, which are interconnected with a rectifier device 139, having a regulator 231 for regulating an excitation current, and a cooling device in the rectifier device 139, said cooling device having a first heat sink 53, which has at least one receptacle 66, on which a current rectifier 147 is received, and a second heat sink 117, wherein heat sink 117 has at least one receptacle 120, on which a current rectifier 150 is received, having an interconnection unit 144, which interconnects the current rectifiers 147, 150 to form a bridge circuit, wherein the interconnection unit 144 has a plurality of integrally formed guide stubs 225, in which conductor ends 228 of the stator winding 18 are received, wherein one guide stub 225 is disposed between the end shield 13.2 and the regulator 231 in the direction of the axis of rotation 26.

Figure 12:
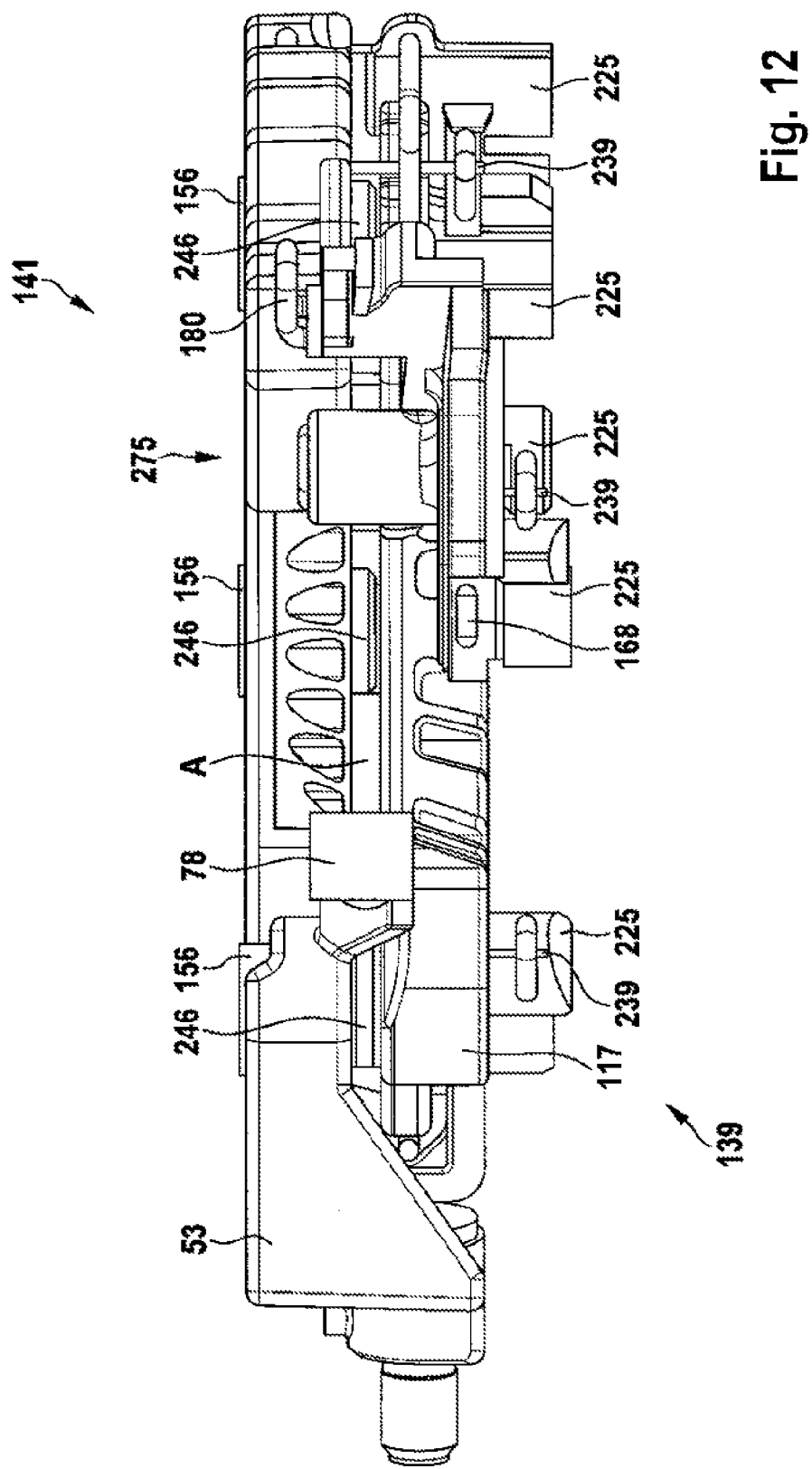
FIG. 12 shows a side view of the rectifier device.

FIG. 12 shows a side view of the cooling device 141. Spacers 246 between the first heat sink 53 and the further heat sink 117 ensure a spacing A between the two heat sinks 53 and 117. The guide stubs 225 are inserted into the openings 228 in the end shield 13.2, with the result that the webs 226 rest on the end shield 13.2. Part of the body of heat sink 117 is disposed between two directly adjacent guide stubs 225; moreover, part of heat sink 117 is surrounded by the webs 226. In FIG. 12, a small number of terminal contacts 239 (diode head wires) of the current rectifiers 147 and 150 can be seen.

Figure 13:
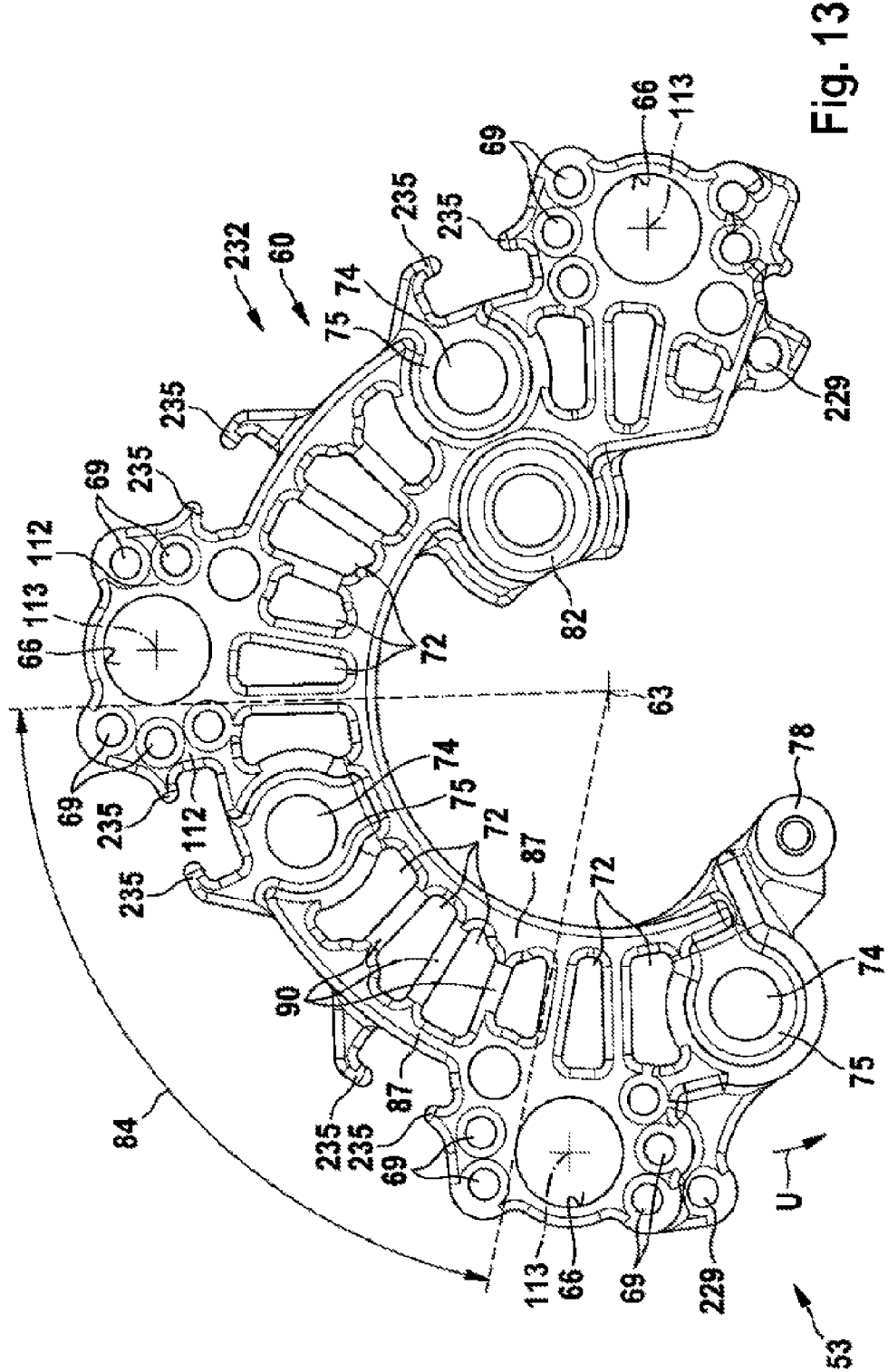
FIG. 13 shows a plan view of a heat sink of a cooling device of a rectifier device in accordance with a second illustrative embodiment.

FIG. 13 shows a first heat sink 53 in another illustrative embodiment. This heat sink 53 has an arcuate sink area 60. This arcuate sink area 60 has a central center point 63. When mounted on the housing 13.2, this central center point 63 coincides with the axis of rotation 26. The heat sink 53 has three receptacles 66, each of which serves to receive a rectifier. In this case, the current rectifier is a positive diode, for example. In this case, the receptacles 66 are in the form of a hole, into which "press-fit" diodes (positive diodes) are subsequently pressed, for example. Instead of a hole, it is also possible, as an alternative, for example, for a depression to be provided in the surface of the first heat sink 53 to enable the diode to be fixed, cf. also the description of the abovementioned illustrative embodiment. Moreover, the heat sink 53 has numerous openings to enable coolant to flow through the heat sink 53, which is hot during operation. First openings 69 are disposed one beside the other in an arc around a receptacle 66. These first openings 69 are disposed on both sides of a receptacle 66 in the circumferential direction U. At least one elongate second opening 72 is disposed in the direction of the central center point 63, between the receptacles 66 and the central center point 63, wherein the elongate shape of the second opening 72 is aligned at least substantially with the central center point 63. As a further approximation, it can also be ascertained that a plurality of elongate second openings 72 is disposed in the direction of the central center point 63, between the receptacles 66 with the first openings 69 and the central center point 63, wherein the elongate shape of the second openings 72 is aligned at least substantially with the central center point 63. Two openings 229, as it were in a second row around the respective receptacle 66, are used to fix the heat sink 53 on the interconnection unit 144, with an optional pin, preferably with a clamping action (interference fit between the pin and the opening 229) or a snap hook of the interconnection unit 144 engaging in the respective opening 229.

Three cylindrical countersunk areas 75, each provided with a hole 74, are furthermore provided in sink area 60. Here, the thickness of the material of the heat sink 53 has been reduced to about 40% of that provided at the receptacles 66. These countersunk areas 75 are used during assembly to fix the rectifier device 139 on the end shield 13.2. A threaded sleeve 78 is used for fixing and contact-making with another component of the rectifier device 139 and, as in the first illustrative embodiment, is formed integrally on the heat sink 53. An insertion dome 82 is used for the subsequent reception and fixing of a "B+ pin" (B plus pin), to which a charging cable is fixed to enable electric current to be fed to a vehicle battery.

As already mentioned, there is a plurality of receptacles 66 disposed spaced apart on the circumference 81 of the heat sink 53.

From FIG. 13, it can be seen that a plurality of elongate second openings 72 is disposed in a segment 84 between two receptacles 66, said openings extending between two spars 87 extending in an arc. The second openings 72 between two arcuate spars 87 are separated by webs 90. The webs 90 preferably extend radially. The two spars 87 extend at least approximately in a circular arc.

The openings 69 are disposed around the receptacles 66. To improve access to terminal contacts shown below, which are positioned next to the openings 69 in the rectifier device 139, provision is made to reduce the thickness of the material of borders 112 of the openings 69 on the side of the openings 69 remote from a center 113 of a receptacle 66 in the axial direction (axis of rotation 26), as compared with that between the receptacles 66 and the openings 69.

By way of example, there are eight hook elements 235 on the outer circumference 232 of the heat sink 53. Each of two respective hook elements 235 disposed in pairs lies opposite the other in such a way that both form an undercut together with the outer circumference 232, further details of this undercut being given later.

FIG. 14a shows a three-dimensional view of a further heat sink 117 of the second illustrative embodiment. Heat sink 117 has three receptacles 120, each of which serves to receive a current rectifier. In this case, the current rectifier is a negative diode, for example. In this case, the receptacles 120 are in the form of a hole, into which "press-fit" diodes (negative diodes) are subsequently pressed, for example. As an alternative, it is also possible, for example, for a depression to be provided in the surface of the further heat sink 120; see also the explanations given above with regard to various ways of fixing diodes. Moreover, heat sink 120 has numerous openings 123 to enable coolant to flow through heat sink 120, which is hot during operation. Three cylindrical depressions 238 are furthermore introduced into the surface of heat sink 117 in order to center cylindrical spacers. Various ribs are illustrated on the outer circumference 241 of heat sink 117. Ribs 244 and 247 are directly adjacent ribs, which may also be referred to as very flat cooling ribs of the sheet-metal—e.g. 4 mm thick—heat sink 117. Between these two ribs 244 and 247 there is a stepped niche 250. This stepped niche 250 consists of a small niche section 253, which is closer to a center (not shown here) of the heat sink 117, than a larger outer niche 256, which opens radially further out and is also part of the niche 250. There is a total of two such stepped niches 250 on the outer circumference 241. There is likewise a further special niche 256—likewise bounded by ribs 259 and 262—on the outer circumference 241. By way of example, there are four round holes 265 to be seen on the outer circumference 241 of the heat sink 117, said holes thus being directly above the webs of an interconnection means (not yet shown in this example), which holes are countersunk on the side on which the depressions 238 are situated. Ribs 268 are disposed in a manner distributed over the inner circumference of the heat sink 117.

In FIG. 14b, which is a view of the ribs 268, a view of a depression 238 can be seen. A pedestal 271 of somewhat larger diameter is situated opposite the depression 238.

Figure 15:
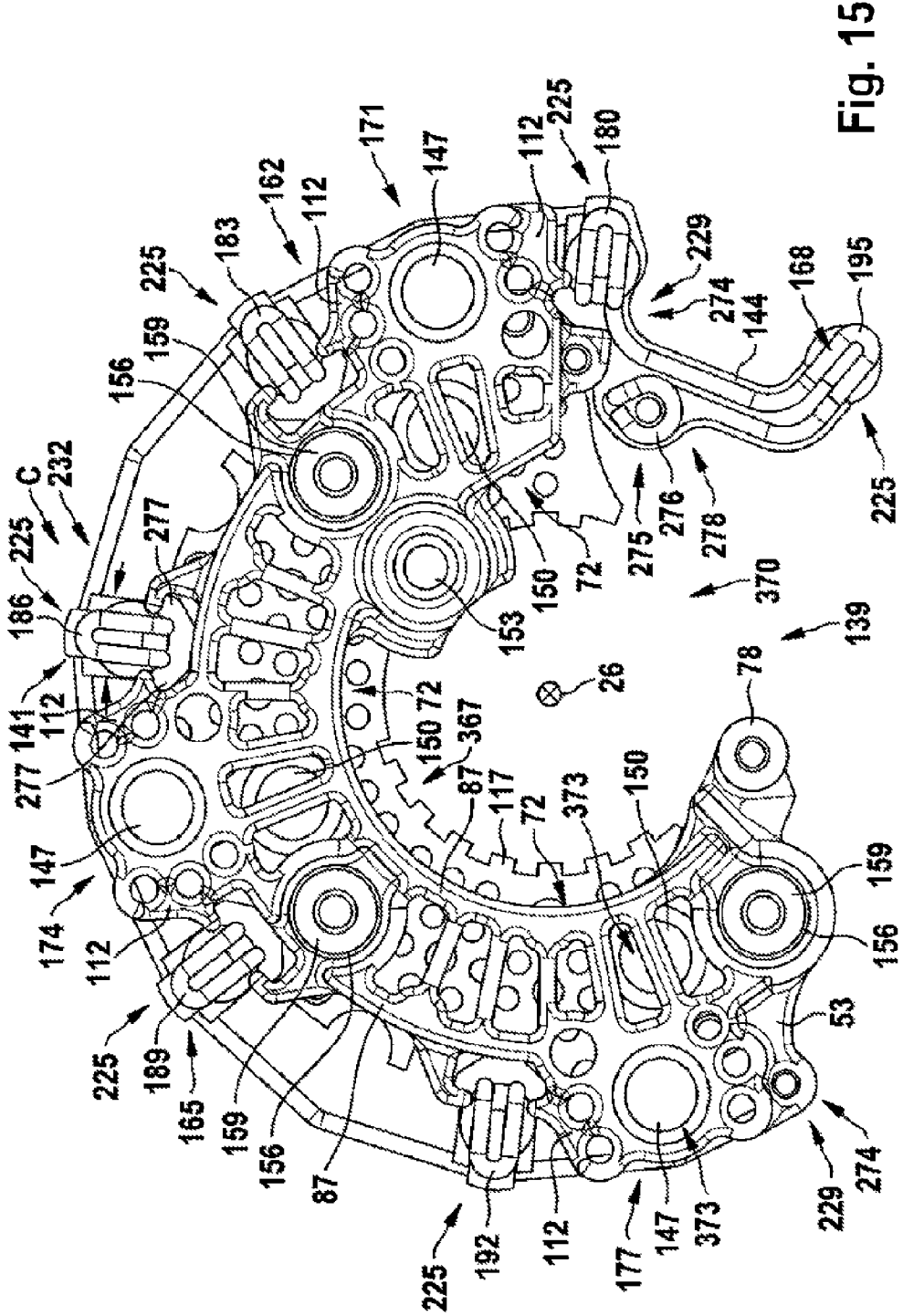
FIG. 15 shows a plan view of the cooling device and the rectifier device in accordance with the second illustrative embodiment.

FIG. 15 shows a plan view of the rectifier device 139 or assembled cooling device 141 comprising the first heat sink 53 (positive heat sink), the second heat sink 117 (negative heat sink), the interconnection unit 144, the positive current rectifiers 147 (positive diodes), the negative current rectifiers 150 (negative diodes), the B+ pin 153, the insulating sleeves 156 and the rivets 159 (tubular rivets). Spacers, which are not visible here, are furthermore used. In relation to FIG. 1, the view of the cooling device 141 corresponds to the view from the right in the direction of the axis of rotation 26, with the protective cap 47 removed.

In a known manner, the interconnection unit 144 has a plurality of conductor sections 162, 165 and 168, which serve to interconnect respective pairs 171, 174 and 177, each comprising a positive current rectifier 147 (positive diode) and a negative current rectifier 150, in such a way that the stator windings connected at the terminal contacts 180, 183, 186, 189, 192 and 195 (circumferential arc) and the alternating voltage supplied thereby are rectified. Terminal contacts 180 and 183 are connected to pair 171, terminal contacts 186 and 189 are connected to pair 174, and terminal contacts 192 and 195 are connected (by way of the circumferential arc 198) to pair 177.

In FIG. 15, it can also be seen that—as in the first illustrative embodiment—the elongate openings 72 are disposed axially (axis of rotation 26) above the negative current rectifiers 150 (negative diodes). Here too, the negative current rectifiers 150 (negative diodes) are on a smaller radius than the positive current rectifiers 147 (positive diodes), in relation to the axis of rotation 26 as the center. That part of heat sink 53 which is bounded by the inner of the two spars 87 is disposed on a larger radius than the region of heat sink 117 which is disposed at this point on the circumference.

The rectifier arrangement is connected to the stator windings at the terminal contacts 180, 183, 186, 189, 192 and 195 (connection arc). For this purpose, as shown in FIG. 11, provision is made for conductor ends 228 (stator connection wires) to be pushed through the guide stubs 225 and the loop-shaped terminal contacts 180, 183, 186, 189, 192 and 195. The actual fixing and contact-making between the terminal contacts 180, 183, 186, 189, 192 and 195 and the conductor ends 228 are accomplished by pushing the terminal contacts 180, 183, 186, 189, 192 and hence the lateral wire regions—see example and contact point C—of the conductor section 165 above the guide stub 225 in the direction of the arrows shown there and welding them together after contact with the conductor ends 228. As an alternative, contact-making by means of soldering is also possible here, for example. To ensure that the lateral wire regions of the conductor section 165 can be moved toward one another at all, correspondingly shaped (welding) tongs are required, for example. The tong components thereof must be inserted between a lateral wire region of a terminal contact and the borders 112 of the openings 69 on the side of the openings 69 remote from a center 113 of a receptacle 66. To make sure this is possible, the thickness of the material of the border 112 is made less in the axial direction (axis of rotation 26) than is the case between the receptacles 66 and the openings 69. The heat sink 53 is less thick there. In FIG. 15, the pins 274 already mentioned in connection with FIG. 13 can be seen, how they project through the opening 229 and connect the heat sink 53 to the interconnection unit 144 with a clamping action in the opening 229. Emanating integrally from a terminal contact 195 directly associated with the short guide stub 225 there is a conductor in the form of a circumferential arc 198, which is disposed partially under an outer edge of a receptacle 66 in the direction of the axis of rotation 26. The circumferential arc 198 is disposed between the end shield 13.2 and the heat sink 53.

A screw-on stub 275 carries a contact loop 276, which covers an overmolded screw nut 278 embedded in the plastic of the screw-on stub. The contact loop 276 serves as a "terminal V". The screw-on stub 275 is of identical construction in all the illustrative embodiments.

Figure 16:
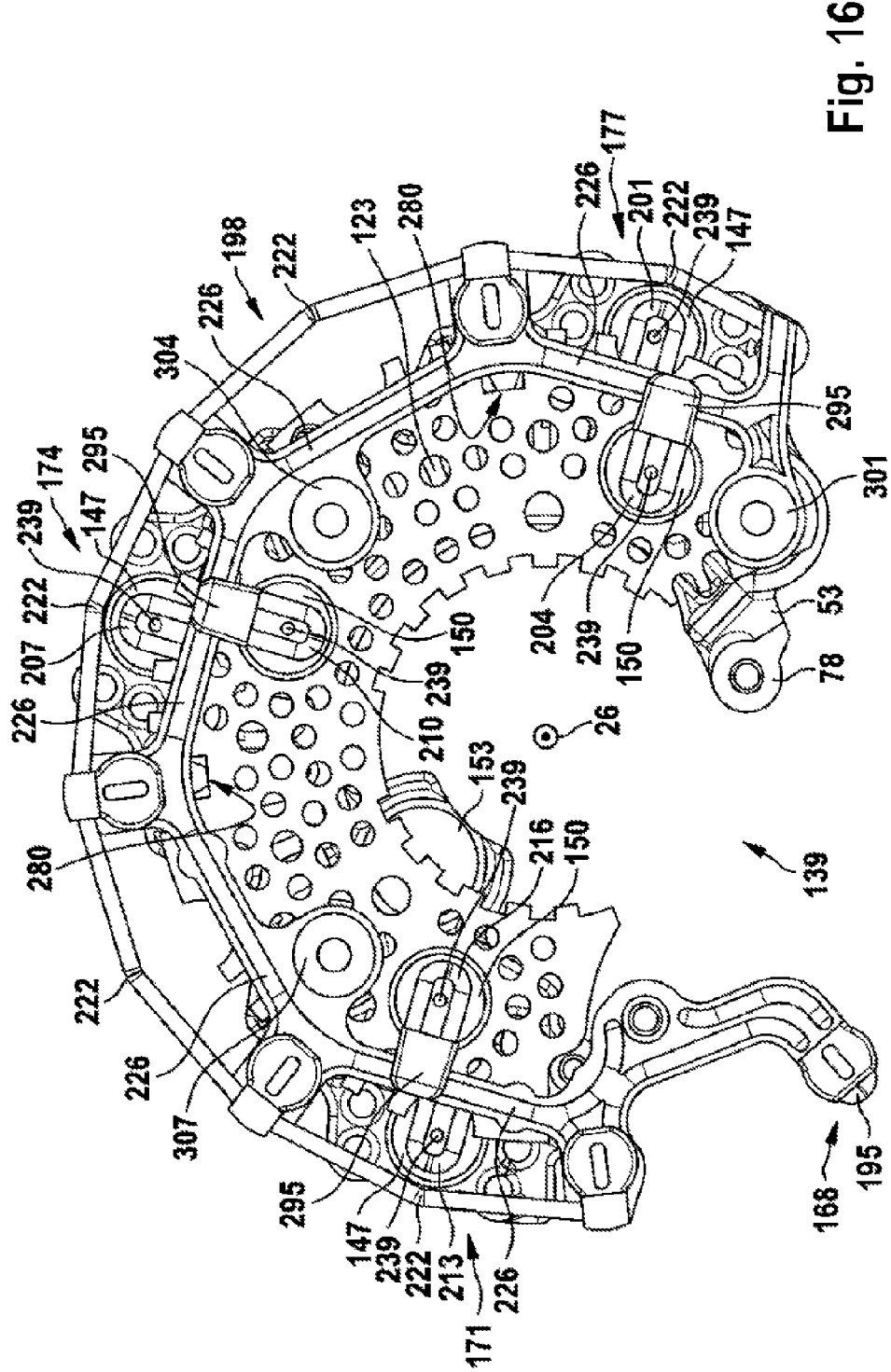
FIG. 16 shows a bottom view of the cooling device shown in FIG. 15, FIG. 17a and FIG. 17b show a side view and a plan view of a guide stub in accordance with both illustrative embodiments.

FIG. 16 shows the assembled cooling device 141 from the other side, that is not shown in FIG. 15. From this side, it is possible to see terminal contacts 201 and 204, terminal contacts 207 and 210 and terminal contacts 213 and 216, each interconnecting one pair 171, 174 and 177, each comprising a positive current rectifier 147 (positive diode) and a negative current rectifier 150. This interconnection corresponds to a conventional bridge rectifier circuit. The positive current rectifiers 147 (positive diodes), press-fit diodes and the negative current rectifiers 150 (negative diodes) are connected in an electrically conductive manner to the first heat sink 53, and therefore there is a positive voltage applied to the B+ pin 153 via the current rectifiers 150 during operation (ON condition, excitation current, rotating rotor 20).

The heat sink 117, which has holes 123, is substantially in the form of an annular segment, wherein the two heat sinks 53 and 117 are layered one above the other, with a spacing, in a manner which allows flow through and between them. As can also be seen from FIG. 9, the circumferential arc 198 of the conductor section 168 has a plurality of bending points 222. Some of these bending points 222 are at the same position on the circumference as terminal contacts 201, 207 and 213. The effect of the bending points 222 is that a spacing (not designated specifically here) between a bending point 222 and a terminal contact 201, 207 and 213 is greater than if a simple circular arc were provided at the position of the bending point 222. This improves access to the terminal contacts 201, 207 and 213, for example, which have to be connected to the terminal contacts of the current rectifiers 147 (diode head wires).

The interconnection unit 144 has guide stubs 225 at a total of six positions in the example shown in FIGS. 15 and 16. These guide stubs 225 are intended, as mentioned above, to receive a number of conductor ends of the stator winding 18 by means of their funnel-shaped ends, which face the viewer in FIG. 16, and to guide them specifically to the terminal contacts 180, 183, 186, 189, 192 and 195 to enable contact to be made easily between the conductor ends and the terminal contacts 180, 183, 186, 189, 192 and 195, preferably by machine. While the guide stub 225 at the "7 o'clock" position is substantially the same in terms of size and configuration as the other four guide stubs 225 ("9 o'clock", "10 o'clock", "12 o'clock" and "2 o'clock" position; position indications with reference to FIG. 16), the guide stub 225 at the "6 o'clock" position has a special feature. Thus, this guide stub 225, which is referred to below as the "small" guide stub 225, does have a terminal contact 195 as well. However, the guide stub 225 itself is a small guide stub 225 and is thus shorter in relation to the axis of rotation 26 than the other guide stubs 225 (see also FIG. 10). The guide stub 225 between the end shield 13.2 and the regulator 231 is shorter in the direction of the conductor ends 228 disposed in the guide stub 225 than other guide stubs 225. The guide stubs 225 are connected integrally to one another by webs 226. Conductor section 162 is situated in the web 226 between the guide stub 225 at the "6 o'clock" position and the guide stub 225 at the "7 o'clock" position. No conductor section is embedded in the web 226 between the "12 o'clock" position and the "2 o'clock" position but there is a conductor section embedded in the web 226 between the "12 o'clock" and the "10 o'clock" position. A further conductor section 162 is embedded between the guide stub 225 at the "2 o'clock" position and the end 227 of the interconnection unit 144, said end then merging into the circumferential arc 198 of conductor section 168 and being routed to the "small" guide stub 225 via the circumference. In FIG. 16, the terminal contacts 239 (diode head wires) of the current rectifiers 147 and 150 can be seen.

The significance of the abovementioned hook elements 235 becomes clear in FIG. 15: the eight hook elements 235 on the outer circumference 232 of the heat sink 53 lead to a clear association between the positions of the heat sink 53 and the current rectifiers 147 received. This allows reliably accurate positioning of the terminal contacts 239 (diode head wires) of the positive current rectifiers 147 relative to the terminal contacts 201, 207 and 213 of the interconnection unit 144. Each of two respective hook elements 235 disposed in pairs lies opposite the other in such a way that both form an undercut together with the outer circumference 232. Two mutually opposite hook elements 235 engage behind two undercuts 277 formed on the guide stub 225, which are situated on both sides of respective terminal contacts 183, 186, 189, 192 and 195 in the plan view shown in FIG. 15. In relation to the axis of rotation 26, the undercuts 277 are at least in part at the same axial position as the guide stubs 225.

Figure 17A:
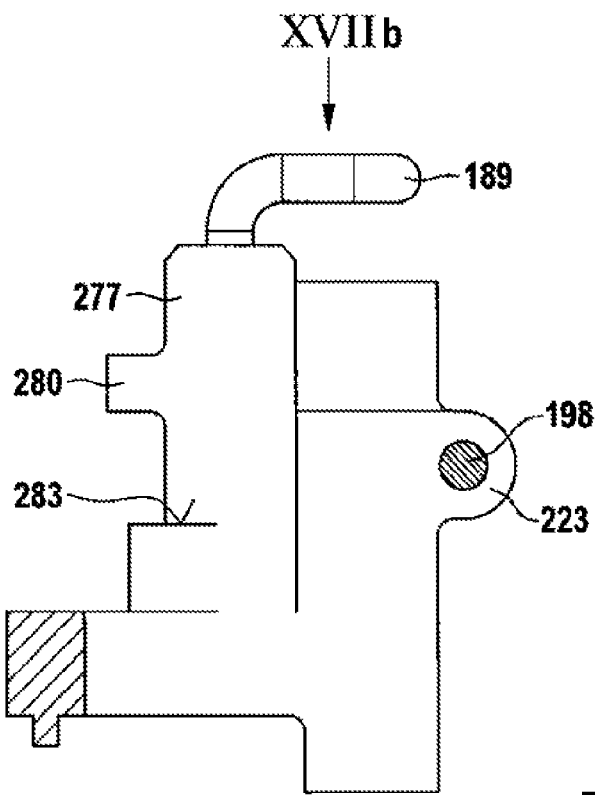
Figure 17B:
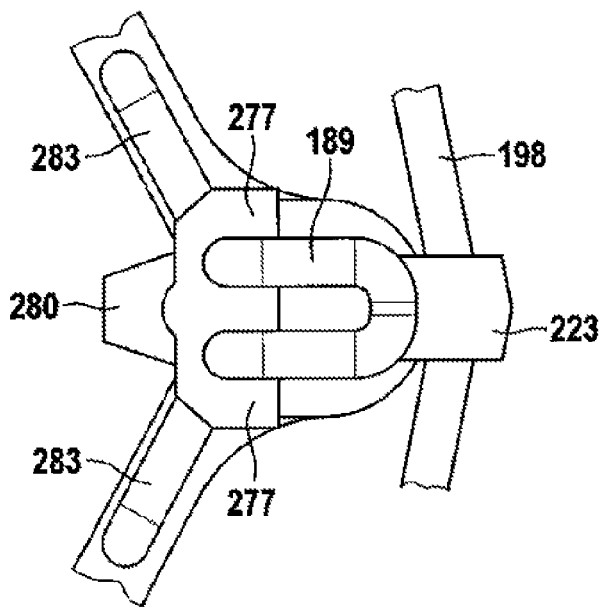

In addition to the task of holding the terminal contacts 180, 183, 186, 189, 192 and 195, at least some of the guide stubs 225 or the closest surroundings thereof have additional functions. Thus, on the one hand, the heat sink 117 has to be centered relative to the interconnection unit 144 and held or gripped at the correct position in the circumferential direction. Moreover, a correct position of the heat sink 117 relative to the interconnection unit 144 in the axial direction (axis of rotation 26) has to be ensured. This makes it possible, on the one hand, to move the current rectifiers 150 (negative diodes) already in the receptacles 66 to the correct position during this assembly step, i.e. to feed them to the terminal contacts 204, 210 and 216 of the interconnection unit 144 in the correct positions. This is achieved by virtue of the fact that a centering projection 280 is formed on the guide stubs 225 on a radial inner side of the guide stubs 225, see also FIGS. 17a and 17b. During the mounting of the heat sink 117 on the interconnection unit 144, this centering projection 280 or centering stub projects into the stepped niche 250 and, more particularly, into the small niche section 253, see also FIG. 16. This centering acts before the terminal contacts 239 (diode head wires) of the current rectifiers 150 (negative diodes) are fed into the terminal contacts 204, 210 and 216 of the interconnection unit 144 at the correct positions. The centering by means of the centering projection 280 or centering stub is preferably still effective after the heat sink 117 has assumed its end position on the pedestals 283, but this is not essential since diode head wires have then generally already been threaded into the corresponding terminal contacts. In this end position, the ribs 244 and 247 are disposed to the right and to the left of a guide stub 225 and bring about a positionally correct association between the heat sink 117 and the guide stub 225 in the circumferential direction. Optional pins and/or snap hooks on the interconnection unit 144 or webs 226 are aligned with the heat sink 117 and additionally engage in openings in order to hold the heat sink 117 at least frictionally and/or positively on the interconnection unit 144.

A subassembly 284 comprising heat sink 53, three insulating sleeves 156, three spacers 246 and three rivets 159 (tubular rivets) in the example, together with three positive current rectifiers 147 (positive diodes) and the B+ pin 153 in the example is preassembled. In this operation, the positive current rectifiers 147 (positive diodes) are first of all accommodated on the receptacles 66 (press-fit diodes are pressed into the receptacles 66, which are configured as cylindrical holes). The terminal contacts 239 (diode head wires) thus project through the holes 74. Preferably following on from this, the three spacers 246 are placed on the side of the heat sink 53 on which the terminal contacts 239 (diode head wires) are to be seen or to be contacted. The stepped insulating sleeves 156 are inserted into the holes 74 from the other side (upper side), and a spacer 246, an insulating sleeve 156 and a rivet 159 (tubular rivet) are in each case fixed to one another in a hole 74. A collar 286 on the rivet 159 then rests on a step 289 of the insulating sleeve 156 and on an end face 292 of a spacer 246. This subassembly 284 is then placed on heat sink 117, with the result that the collar 286 of the rivet 159 comes to rest in a cylindrical depression 238 in heat sink 117. In this arrangement, the hook elements 235 each reach in the manner described around the undercuts 277 formed on the guide stub 225. At the same time, the terminal contacts 239 (diode head wires) of the positive current rectifiers 147 are guided to the terminal contacts 201, 207 and 213 of the interconnection unit 144 and connected thereto.

Figure 19:
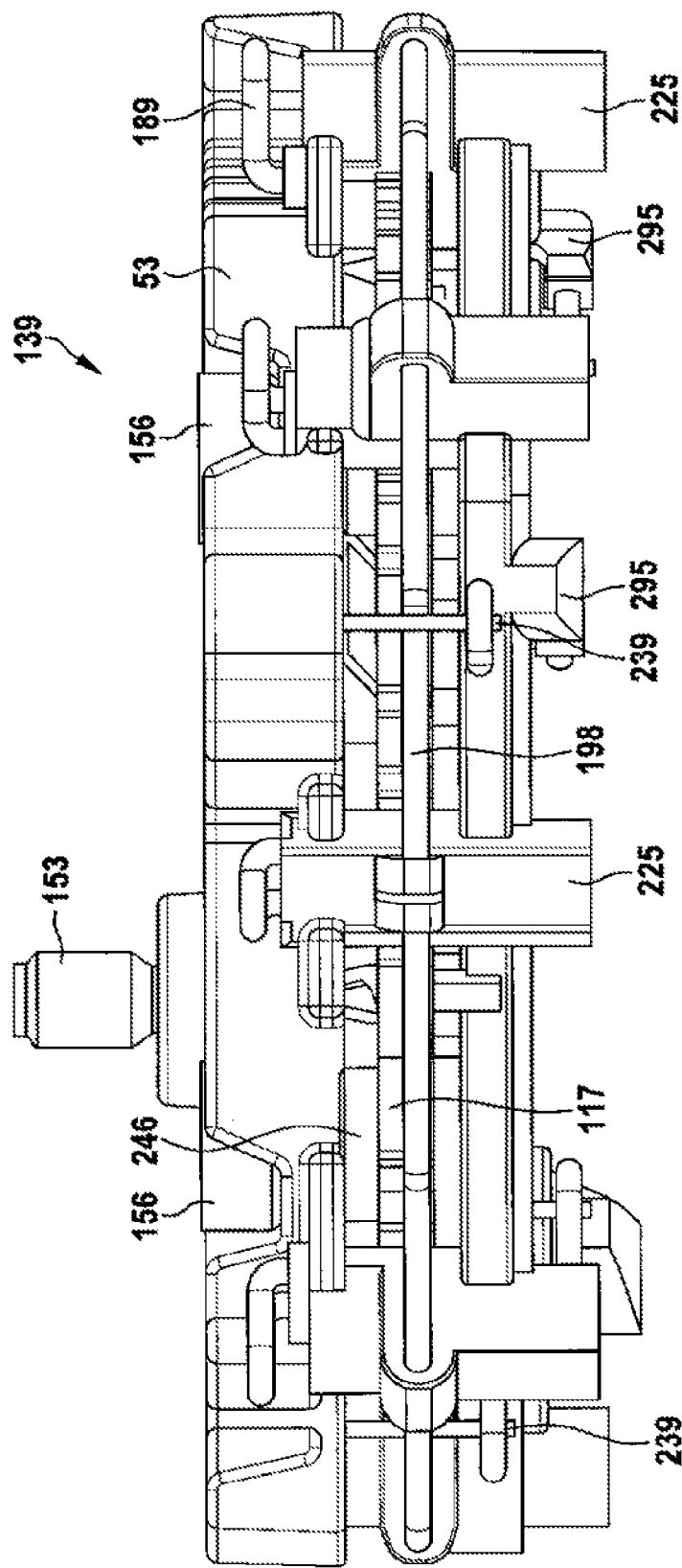
FIG. 19 shows a side view of the rectifier device in accordance with the second illustrative embodiment.

FIG. 19 shows the construction of the cooling device and of the rectifier in a side view (perpendicular to the axis of rotation 26). In this side view, pedestals 295 starting from the webs 226 and projecting downward, that is to say projecting away from heat sink 117 on the side remote from heat sink 117, can be seen on the interconnection unit 144, and these pedestals can also be seen in the bottom view in FIG. 16. While the terminal contacts 201, 207 and 213 extend radially outward and emerge from the webs 226 in the same plane as the latter, the wire in the webs 226 is bent "downward" in the axial direction (direction of rotation 26) and in the direction away from heat sink 53 and, after a certain distance, extends radially inward and emerges from the pedestals 295.

Figure 18:
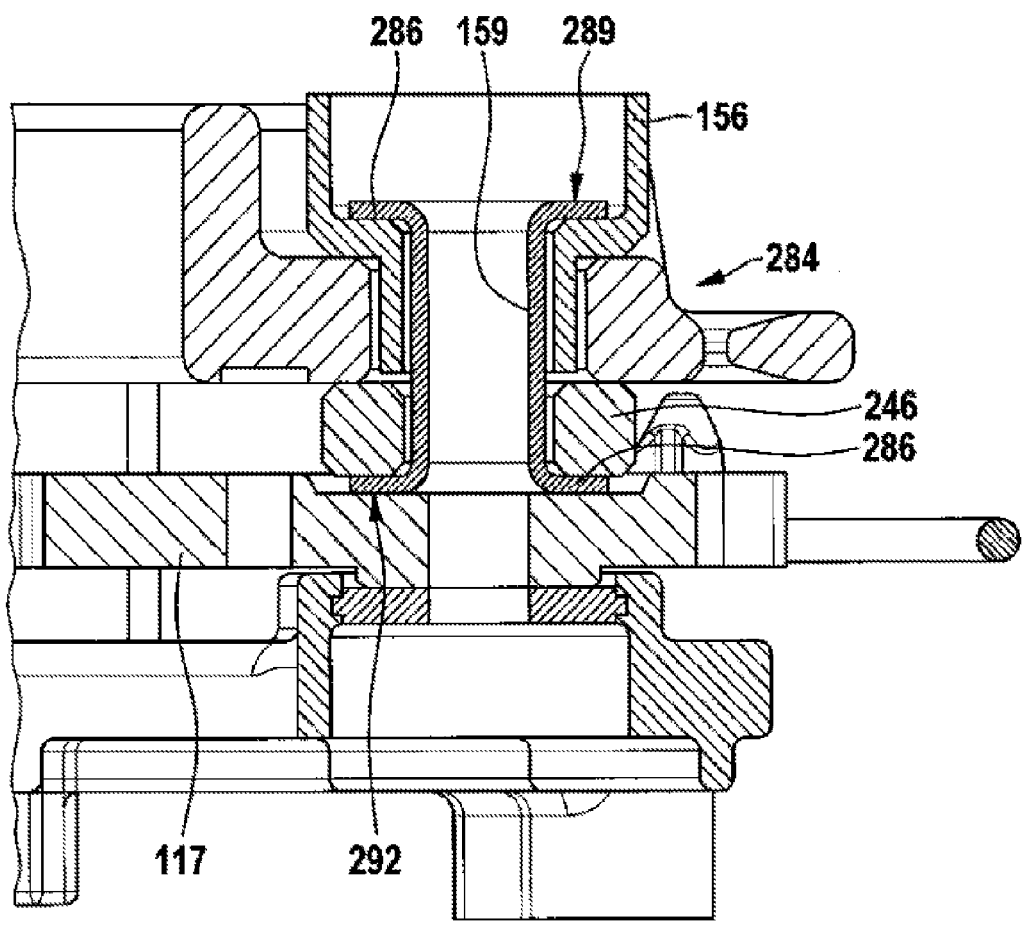
FIG. 18 shows a schematic sectional view through the layered structure in accordance with both illustrative embodiments.

In FIG. 20, the end shield 13.2 is illustrated in a three-dimensional representation. This end shield 13.2 has three fixing stubs 298 (screw stubs with an internal thread), which serve to receive the rectifier device 139 for fixing on the end shield 13.2. For this purpose, the round, centrally holed bearing surfaces (metal inserts, see also FIG. 18) 301, 304 and 307 illustrated in FIG. 16 are each placed on a fixing stub 298. In this process, the bearing surface 301 which is closest to the threaded sleeve 78 is placed on the fixing stub 298 which is depicted on the right in FIG. 20. The bearing surface 304 which is disposed between the two other bearing surfaces 301 and 307 is placed on the central one of the three fixing stubs 298. There are numerous slotted air outlet openings 308 distributed over the outer circumference of the end shield 13.2.

The guide stubs 225 illustrated in FIGS. 15 and 16 are inserted as follows into openings 228, 313, 316, 319, 322 and 325 with reference to FIG. 16: as already described with reference to FIG. 11, the small guide stub 225 is inserted into the opening 228 which is disposed axially (axis of rotation 26) below the regulator. This opening is introduced in the end region 334 of the end shield 13.2 between a fixing stub 328 (screw stub with internal thread) and a ridge 331. The fixing stub 328 holds the regulator 231. The other guide stubs 225 are inserted into said openings one after the other in a corresponding manner.

A hub 337, into which the bearing 28 is inserted (see FIG. 1), is formed centrally on the end shield 13.2. In this case, this hub is connected by four struts 340 to the end region 334 of the end shield 13.2. Between the struts 340 and the end region 334 there are four large openings 40, through which cooling air is drawn during the operation of the generator or electric machine 10 owing to the movement of the fan 30. Three of these openings 40 are provided with through niches 346, which are formed on the radially outer edge 349. The pedestals 295 of the interconnection unit 144 project into said niches 346 in such a way that they are at a common axial level (axis of rotation 26). That is to say, the pedestal 295 and, if required, the connecting wire 216 extend into a plane formed by the openings (main openings) 40, and the wire then extends exclusively in this plane, for example. The shape of the pedestals 295 and the shape of the niches 346 are matched to one another. This means that the pedestals 295 almost fill or completely fill the niches 346. The advantage of this arrangement is the maximization of the usable opening 40 and the possibility of a small effective edge portion of the opening 40 that can be achieved. This has the effect that edge effects entailed by the laws of fluid mechanics, such as boundary layers that reduce the cooling air flow rate, for example, are less in evidence. Moreover, at least one opening 40—in this case three—adjoins (adjoin) a flat end face region 352 which is lower than other end face regions 355 when viewed axially from the outside. This has the advantage that a larger gap is produced between the web 226 and the end shield 13.2, despite the fact that the web 226 may be resting on top, this gap lowering the flow resistance and thereby increasing the air flow rate. In the case of a three-phase electric machine 10, three niches 346 would be occupied by corresponding pedestals 295, as in the case described here. In the case of a five-phase machine, five niches 346 would be occupied by corresponding pedestals 295. However, it is not necessarily the case that a niche 346 must be formed for each pedestal 295.

Figure 22:
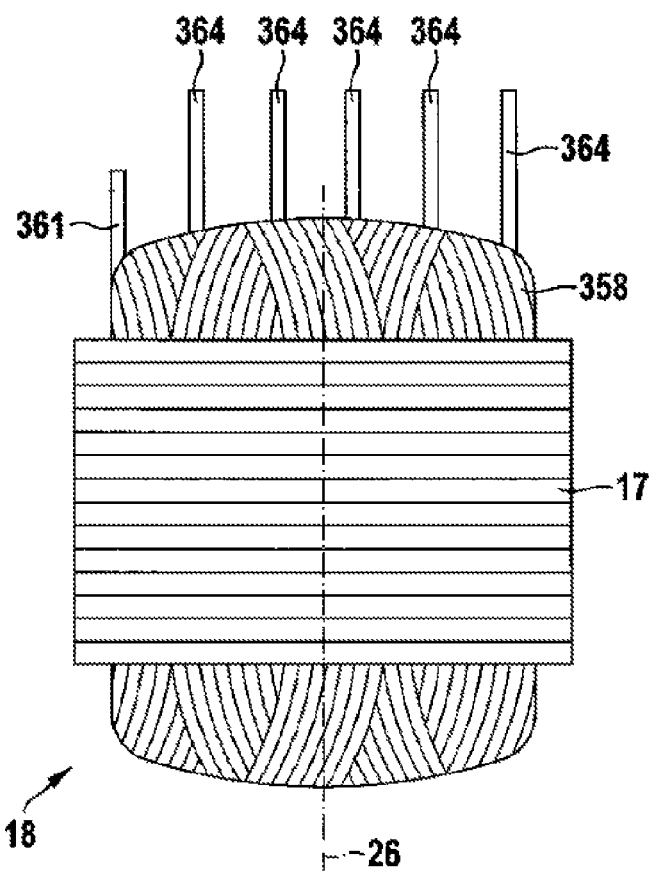
FIG. 22 shows a stator in a side view.

The short guide stub 225 already mentioned above requires a significantly shorter and preferably axial extent (axis of rotation 26) or length of a stator terminal 361 on the side of the stator 16 with its stator iron 17, into the grooves of which a stator winding 18 with individual phase or strand windings 358 is inserted, FIG. 22, than is the case for the other stator terminals 364. "Significantly shorter" means a difference in length of 20 mm, for example (when installed in the electric machine for example). In the context of the design under consideration, there is thus one stator terminal 361 in the short guide stub 225 under the regulator 231, while the other stator terminals 364, in this case five stator terminals, are inserted into the other (long) guide stubs 225. All the stator terminals 361 and stator terminals 364 extend in the axial direction (axis of rotation 26), e.g. in the guide stubs 225.

The second illustrative embodiment, which has been described from FIG. 13 onward, has an inner spar 87 which is disposed on a larger radius than the inner edge 367 in relation to the axis of rotation 26 and at the same circumferential position. This has the effect that a central opening 370 of the rectifier device 139 increases in size in a funnel-like manner in a direction axially outward and away from the end shield 13.2.

In all the illustrative embodiments, the illustrated bottoms 373 of the current rectifiers 147 and 150 illustrated by way of example as press-fit diodes face away from the end shield 13.2. Heat sink 53 is produced in one piece from a metal or a metal alloy by means of a diecasting process. Aluminum or an aluminum alloy is used for this purpose. The same materials are used for heat sink 117.

An illustrative embodiment will be on public view from November 2010 until at least April 2011, inclusive, both at the Rheinisch-Westfälische Technische Hochschule Aachen, Institut für Elektrische Maschinen, Lehrstuhl für elektromagnetische Energiewandlung, Schinkelstrasse 4, 52062 Aachen, Germany, and at Leibniz Universität Hannover, Institut für Antriebssysteme and Leistungselektronik, Weifengarten 1, 30167 Hannover, Germany.

The invention claimed is:

1. An electric machine (10) having a rotor (20), which has an axis of rotation (26), a stator (16) including a stator iron (17) and a stator winding (18) inserted therein, which winding has conductor ends (228), which are interconnected with a rectifier device (139), a regulator (231) for regulating an excitation current, and a cooling device in the rectifier device (139), said cooling device having a first heat sink (53), which has at least one receptacle (66), on which a current rectifier (147) is received, having a second heat sink (117), wherein the second heat sink (117) has at least one receptacle (120), on which a current rectifier (150) is received, and having an interconnection unit (144), which interconnects the current rectifiers (147, 150) to form a bridge circuit, wherein the interconnection unit (144) has a plurality of integrally formed guide stubs (225), in which conductor ends (228) of the stator winding (18) are received, characterized in that an arm (234) of the interconnection unit (144) connects one guide stub (225) integrally to another, shorter guide stub (225), wherein the shorter guide stub (225) and the arm (234) are disposed between an end shield (13.2) and the regulator (231) in the direction of the axis of rotation (26).

2. The electric machine as claimed in claim 1, characterized in that the arm (234) reaches around a fixing stub (328) radially from the inside.

3. The electric machine as claimed in claim 2, characterized in that the regulator (231) is held by the fixing stub (328).

4. The electric machine as claimed in claim 1, characterized in that a conductor in the form of a circumferential arc (198), which is disposed partially under an outer edge of at least one receptacle (66) in a direction of the axis of rotation (26), starts from a terminal contact (195) directly associated with the shorter guide stub (225).

5. The electric machine as claimed in claim 4, characterized in that the circumferential arc (198) is disposed between the end shield (13.2) and the first heat sink (53).

6. The electric machine as claimed in claim 4, characterized in that the circumferential arc (198) has a plurality of bending points (222), wherein some of the bending points (222) are disposed at a same circumferential position as terminal contacts (201, 207, 213).

7. The electric machine as claimed in claim 4, characterized in that the circumferential arc (198) extends over an angle with respect to the axis of rotation (26) which is greater than a total angle over which the current rectifiers (147) and (150) extend in the heat sinks (53) and (117).

8. The electric machine as claimed in claim 4, characterized in that the circumferential arc (198) is supported on the guide stubs (225) by means of integrally formed lugs (223).

9. The electric machine as claimed in claim 1, characterized in that the stator winding (18) disposed in the stator (16) or stator iron (17) has conductor ends (228) which are of different lengths.

10. The electric machine as claimed in claim 9, characterized in that the conductor ends (228) are matched to the guide stubs (225) of different sizes.

11. The electric machine as claimed in claim 1, characterized in that the machine is an alternating current generator.

\* \* \* \* \*